US012711095B2

(12) United States Patent
Zhang et al.

(10) Patent No.: US 12,711,095 B2
(45) Date of Patent: Aug. 18, 2026

(54) NETWORKS ON CHIP (NOC) FOR MANY-CORE NEURAL NETWORK ACCELERATOR

(71) Applicant: MOFFETT INTERNATIONAL CO., LIMITED, Hong Kong (HK)

(72) Inventors: Xiaoqian Zhang, Los Altos, CA (US); Zhibin Xiao, Los Altos, CA (US)

(73) Assignee: Moffett International Co., Limited, Hong Kong (HK)

( * ) Notice: Subject to any disclaimer, the term of this patent is extended or adjusted under 35 U.S.C. 154(b) by 79 days.

(21) Appl. No.: 18/908,649

(22) Filed: Oct. 7, 2024

(65) Prior Publication Data

US 2025/0028673 A1 Jan. 23, 2025

Related U.S. Application Data

(63) Continuation of application No. 18/197,536, filed on May 15, 2023, now Pat. No. 12,117,961, which is a (Continued)

(51) Int. Cl.
*G06F 15/78* (2006.01)
*G06F 13/40* (2006.01)
(Continued)

(52) U.S. Cl.
CPC ...... *G06F 15/7825* (2013.01); *G06F 13/4059* (2013.01); *G06F 15/8015* (2013.01); *G06N 3/045* (2023.01)

(58) Field of Classification Search
CPC ............ G06F 15/7825; G06F 15/8015; G06F 13/4059; G06N 3/045; G06N 3/0464; G06N 3/063
See application file for complete search history.

(56) References Cited

U.S. PATENT DOCUMENTS 9,710,265 B1 7/2017 Temam et al.
11,455,222 B2 9/2022 Liu et al.
(Continued)

FOREIGN PATENT DOCUMENTS

CN 115277551 A 11/2022

OTHER PUBLICATIONS

US 11,868,307 B1, 01/2024, Zhang (withdrawn)
(Continued)

*Primary Examiner* — Brian T Misiura
(74) *Attorney, Agent, or Firm* — Sheppard Mullin Richter & Hampton LLP

(57) ABSTRACT

This application describes a network-on-chip system on a hardware accelerator for accelerating neural network computations. An example NoC system in the NN accelerator may include interconnected routers with routing control circuits and cores respectively coupled to the routers. The cores are arranged into a matrix. Each row of cores are connected with a first uni-directional ring-shape data link and every two adjacent data links are in opposite directions. Each column of cores are connected with a second uni-directional ring-shape data link and every two adjacent data links are in opposite directions. In a given router of the plurality of routers, the routing control circuit is configured to: receive a data package; convert physical addresses of the given router and the target router into logical addresses; determine a routing port of the given router based on the logical addresses; and output the data package through the routing port.

18 Claims, 19 Drawing Sheets

Related U.S. Application Data continuation of application No. PCT/CN2023/086567, filed on Apr. 6, 2023.

(51) Int. Cl.

| | |
|---|---|
| ***G06F 15/80*** | (2006.01) |
| *G06N 3/045* | (2023.01) |

(56) References Cited

U.S. PATENT DOCUMENTS

| | | | | |
|---|---|---|---|---|
| 11,496,418 | B1 | 11/2022 | Blair et al. | |
| 11,500,748 | B1 * | 11/2022 | Ofir | G06F 11/0772 |
| 12,067,472 | B2 * | 8/2024 | Appuswamy | G06N 3/06 |
| 12,072,834 | B1 * | 8/2024 | Zhang | G06N 3/045 |
| 2016/0323137 | A1 * | 11/2016 | Alvarez-Icaza Rivera | G06F 11/0793 |
| 2016/0344629 | A1 | 11/2016 | Gray | |
| 2018/0365553 | A1 | 12/2018 | Nowatzyk et al. | |
| 2020/0150958 | A1 | 5/2020 | Ahmed | |
| 2022/0414053 | A1 | 12/2022 | Parra et al. | |
| 2026/0017226 | A1 * | 1/2026 | Xiao | G06F 15/7814 |

OTHER PUBLICATIONS

PCT International Search Report and the Written Opinion mailed Dec. 25, 2023, issued in related International Application No. PCT/CN2023/086567 (7 pages).

Non-Final Office Action dated Mar. 25, 2024, issued in corresponding U.S. Appl. No. 18/197,536 (7 pages).

* cited by examiner

200 Accelerator

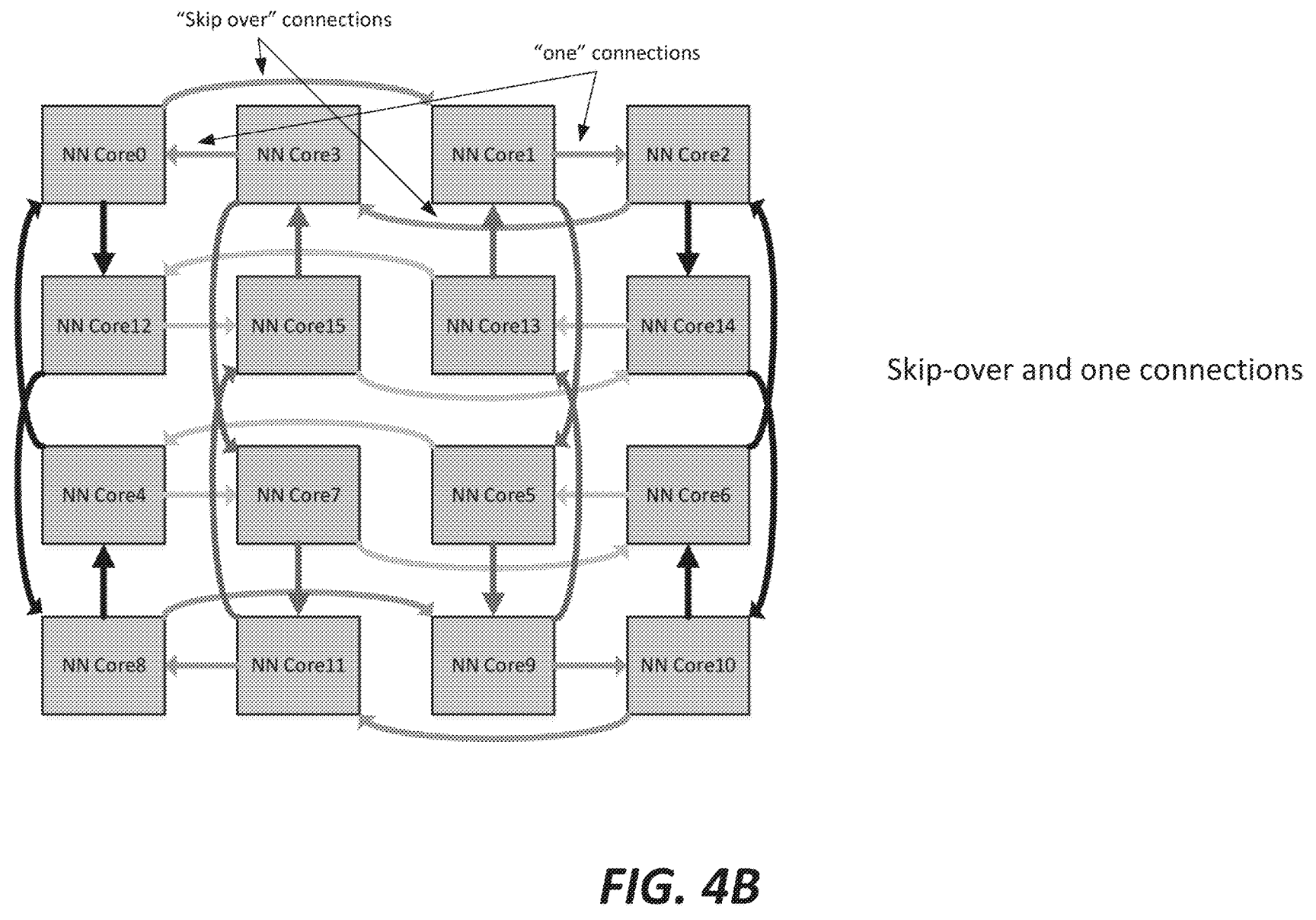

Skip-over and one connections

"Skip over" connections

"one" connections

NN Core2
NN Core14
NN Core6
NN Core10

NN Core1
NN Core13
NN Core5
NN Core9

NN Core3
NN Core15
NN Core7
NN Core11

NN Core0
NN Core12
NN Core4
NN Core8

FIG. 4B

| Output / Input | B | D | F |
|---|---|---|---|
| A | Y | Y | Y |
| C | Y | N/A | Y |
| E | Y | Y | N/A |

700

4x2 NoC routing algorithm with universal address mapping

- Routing algorithm
  - Destination address: A/B/D -> output port corresponding to the vertical ring
  - Destination address: E/F/G/H -> output port corresponding to the horizontal ring
  - Destination address: C -> output port: GLB write

720

4x2 NoC routing example: R4->R2

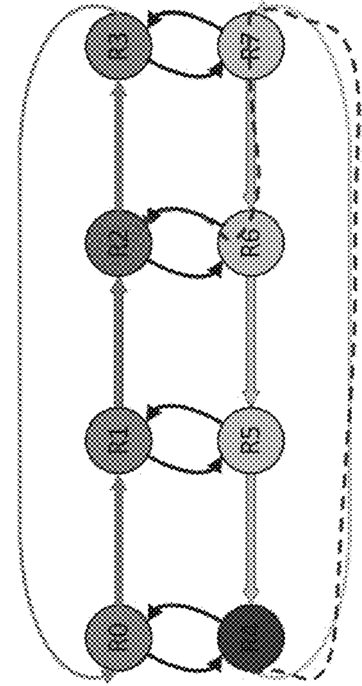

- Routing path
  - R4: GLB/GLBW read -> horizontal ring output
  - R7: global ring input -> horizontal ring output
  - R6: global ring input -> vertical ring output
  - R2: vertical ring input -> GLB write
- R4 -> R2: skip/bypass two hops (R7 & R6)

*FIG. 7A*

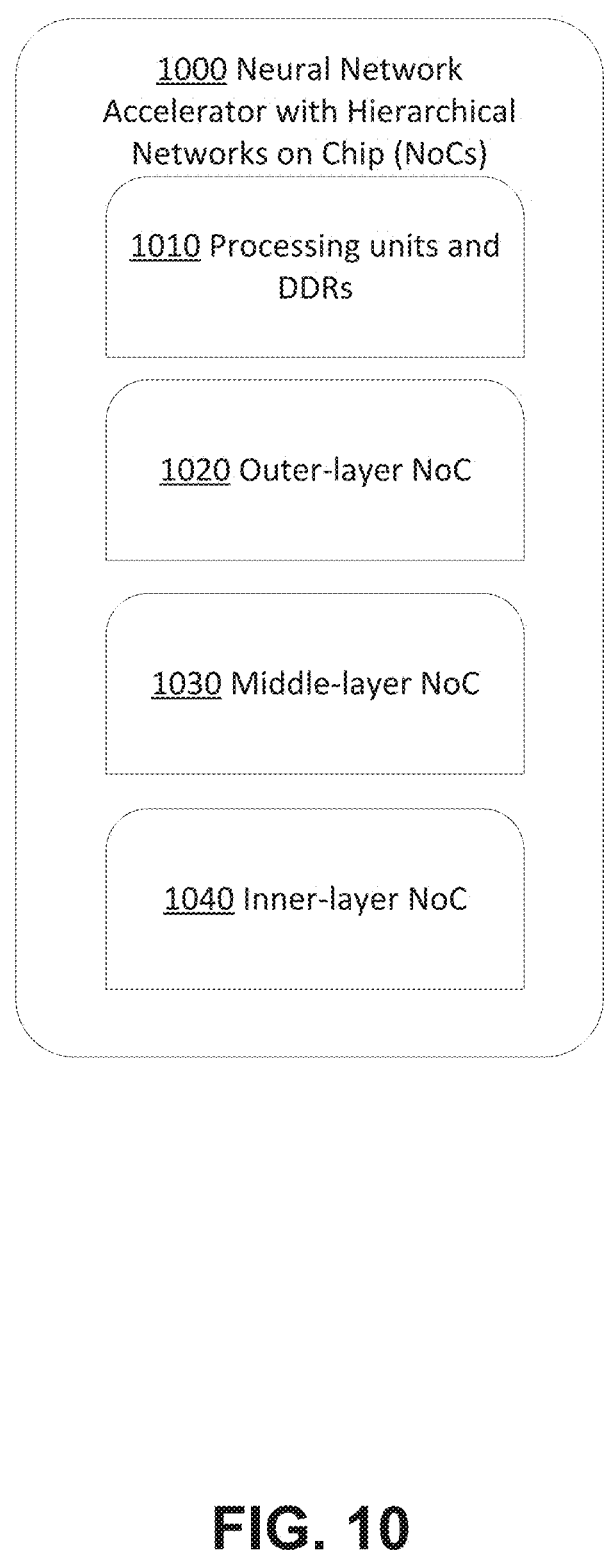

1000 Neural Network Accelerator with Hierarchical Networks on Chip (NoCs)

1010 Processing units and DDRs

1020 Outer-layer NoC

1030 Middle-layer NoC

1040 Inner-layer NoC

FIG. 10

NETWORKS ON CHIP (NOC) FOR MANY-CORE NEURAL NETWORK ACCELERATOR

CROSS REFERENCE TO RELATED APPLICATION

This application is a continuation of U.S. patent application Ser. No. 18/197,536, filed on May 15, 2023, which is a continuation application of International Application No. PCT/CN2023/086567, filed on Apr. 6, 2023. The contents of the above-identified applications are hereby incorporated by reference in their entirety.

TECHNICAL FIELD

The disclosure generally relates to a hardware design for accelerating end-to-end model execution on a many-core spatial neural network accelerator with versatile workload support. In particular, the disclosure describes a Network-on-Chip (NoC) system on a neural network accelerator with both reduced area/power consumption and fault-tolerant capabilities.

BACKGROUND

End-to-end Neural Network (NN) computation usually involves executing various types of workloads at different levels within a hardware NN accelerator. These workloads are different from performance (bandwidth, throughput, and latency), cost (area and power), and flexibility (programmability, reusability, etc.) perspectives. For example, the NN accelerator may be equipped with a plurality of cores for parallel processing of the NN computation workloads. During this process, the cores may need to share data or form a pipeline, in which the data migration may be in any pattern such as one-to-one, one-to-many, many-to-one, or many-to-many.

As a result, one universal NoC architecture is unable to efficiently handle the different types of workloads. For example, conventional bus or mesh-based NoCs used in Chip Multi-Processors (CMP) or System-on-Chip (SoC) today are not appropriate for scattering or reshuffling workloads as they either limit achievable throughput or add significant area and power penalties. Customized NoCs for neural network workload are not appropriate for CMPs/SoCs purposes as well since they are not flexible enough to work with different modules in CMPs/SoCs. To address these issues, a uni-directional link-based NoC architecture is proposed to improve the computation efficiency of NN accelerators with reduced area and power consumption as well as fault tolerance.

SUMMARY

Various embodiments of the present specification may include a Network-on-Chip system in hardware accelerators and devices for accelerating neural network computations.

In some aspects, the techniques described herein relate to a many-core neural network (NN) accelerator. The accelerator may include: a plurality of routers, each router including a routing control circuit, and a plurality of cores respectively coupled to the plurality of routers to form a Network-on-Chip (NoC); wherein: the plurality of cores are arranged, in a logic view, as a matrix, each row of the matrix including a same number of cores; each row of cores are connected, through corresponding routers, in a first uni-directional ring-shape data link and every two adjacent first uni-directional ring-shape data links are in opposite directions; each column of cores are connected, through corresponding routers, in a second uni-directional ring-shape data link and every two adjacent second uni-directional ring-shape data links are in opposite direction; and the routing control circuit in each router is configured to manage routing logics for data read from an internal buffer of the coupled core and data received from another router.

In some aspects, to manage routing logics for data read from an internal buffer of the corresponding core and data received from another router, the routing control circuit of a router in the plurality of routers is configured to: convert a physical address of the router to a first logical address; in response to the router receiving a data package for routing to a target router, convert a physical address of the target router into a second logical address; determine a routing port of the router based on the first and second logical addresses; and route the data package through the routing port of the router.

In some aspects, the plurality of cores are coupled with internal buffers, and the NoC is configured for any core of the plurality of cores to unicast or multicast data from the coupled internal buffer to other cores in the NN accelerator.

In some aspects, for a given core of the plurality of cores, the corresponding router includes at least two ports, wherein a first port is coupled to the first uni-directional ring-shape data link on which the given core is located, and a second port is coupled to the second uni-directional ring-shape data link on which the given core is located.

In some aspects, to determine the routing port of the router based on the first and second logical addresses, the routing control circuit of the router is further configured to: obtain a first address mask corresponding to the first port, the first address mask including a bit map indicating one or more cores of the plurality of cores that are reachable through the first port within a predetermined number of hops; obtain a second address mask corresponding to the second port, the second address mask including a bit map indicating one or more cores of the plurality of cores that are reachable through the second port within the predetermined number of hops; and apply the first and second address masks to the first and second logical addresses to select the routing port from the first port and the second port.

In some aspects, the routing control circuit of the router is further configured to: detect a neighboring router corresponding to one of the two ports being defective; in response to the neighboring router being defective but supporting bypass, keep the port corresponding to the neighboring router open; and in response to the neighboring router being defective and not supporting bypass, disable the port corresponding to the neighboring router.

In some aspects, each of the plurality of cores includes an internal buffer, and for the given core of the plurality of cores, the corresponding router further includes a third port coupled to the internal buffer of the given core.

In some aspects, when the third port of the given core is defective, the given core is determined as defective but supporting bypass; and when one of the first port or the second port is defective, the given core is determined as defective and not supporting bypass.

In some aspects, to convert the physical address of the router and the physical address of the target router into logical addresses, the routing control circuit of the router is further configured to: convert the physical address of the router to a predetermined logical address; and assign logical addresses to other cores in the plurality of cores based on a location of the router, relative locations of the other cores, and the predetermined logical address of the router.

In some aspects, to assign logical addresses to other cores in the plurality of cores based on a location of the router and the predetermined logical address, the routing control circuit is further configured to: perform one or more transformation operations on the matrix to move the router to a predetermined location corresponding to the predetermined logical address, wherein the one or more transformation operations include rotating the matrix and shifting the matrix left or right.

In some aspects, the rotating the matrix includes rotating the matrix by 180 degree.

In some aspects, the routing control circuit of the router is further configured to: receive a casted data package addressed to multiple target routers with corresponding physical addresses; convert physical addresses of the multiple target routers into logical addresses; determine one or more ports of the router for routing the casted data package based on the logical addresses; and route the casted data package through the one or more ports of the router.

In some aspects, the techniques described herein relate to a Network-On-Chip (NoC) system in a neural network accelerator. The NoC system includes: a plurality of routers respectively coupled to a plurality of cores in the neural network accelerator, each router including a routing control circuit, wherein: the plurality of routers are arranged, in a logic view, as a matrix, each row of the matrix including a same number of routers; each row of routers are connected in a first uni-directional ring-shape data link and every two adjacent first uni-directional ring-shape data links are in opposite directions; each column of routers are connected in a second uni-directional ring-shape data link and every two adjacent second uni-directional ring-shape data links are in opposite directions; and the routing control circuit in each router is configured to manage routing logics for data read from an internal buffer of the coupled core and data received from another router.

In some aspects, to manage routing logics for data read from an internal buffer of the corresponding core and data received from another router, the routing control circuit is configured to: convert a physical address of the router to a first logical address; in response to the router receiving a data package for routing to a target router, convert a physical address of the target router into a second logical address; determine a routing port of the router based on the first and second logical addresses; and route the data package through the routing port of the router.

In some aspects, for a given core of the plurality of cores, the corresponding router includes at least two ports, wherein a first port is coupled to the first uni-directional ring-shape data link on which the given core is located, and a second port is coupled to the second uni-directional ring-shape data link on which the given core is located.

In some aspects, to determine the routing port of the given router based on the logical addresses, the routing control circuit of the given router is further configured to: obtain a first address mask corresponding to the first port, the first address mask including a bit map indicating one or more cores of the plurality of cores that are reachable through the first port within a predetermined number of hops; obtain a second address mask corresponding to the second port, the second address mask including a bit map indicating one or more cores of the plurality of cores that are reachable through the second port within the predetermined number of hops; and apply the first and second address masks to the first and second logical addresses to select the routing port from the first port and the second port.

In some aspects, the routing control circuit of the given router is further configured to: detect a neighboring router corresponding to one of the two ports is defective; in response to the neighboring router being defective but supporting bypass, keep the port corresponding to the neighboring router open; and in response to the neighboring router being defective and not supporting bypass, disable the port corresponding to the neighboring router.

In some aspects, each of the plurality of cores includes an internal buffer, and for the given core of the plurality of cores, the corresponding router further includes a third set of ports coupled to the internal buffer of the given core.

In some aspects, when the third port of the given core is defective, the given core is determined as defective but supporting bypass; and when one of the first port of the second port is defective, the given core is determined as defective and not supporting bypass.

In some aspects, to convert the physical address of the router and the physical address of the target router into logical addresses, the routing control circuit of the given router is further configured to: convert the physical address of the router to a predetermined logical address; and assign logical addresses to other cores in the plurality of cores based on a location of the router, relative locations of the other cores, and the predetermined logical address of the router.

In some aspects, the techniques described herein relate to a computer-implemented method, including: converting, by a routing control circuit of a router, a physical address of the router to a first logical address, wherein the router is a part of a Network-on-Chip (NoC) in a many-core neural network (NN) accelerator; receiving, at the router, a data package for routing to a target router in the NoC; converting a physical address of the target router into a second logical address; determining a routing port of the router based on the first and second logical addresses, wherein the router includes at least a first port and a second port, and the determining includes: obtaining a first address mask corresponding to the first port, the first address mask including a bit map indicating one or more routers in the NoC that are reachable through the first port within a predetermined number of hops; obtaining a second address mask corresponding to the second port, the second address mask including a bit map indicating one or more routers in the NoC that are reachable through the second port within the predetermined number of hops; and applying the first and second address masks to the first and second logical addresses to select the routing port from the first port and the second port.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

FIG. 4B illustrates a system view of the exemplary core-level NoC from FIG. 4A, in accordance with various embodiments.

FIG. 7A illustrates an exemplary routing algorithm for a core-level NoC in a hardware accelerator, in accordance with various embodiments.

FIG. 10 illustrates an exemplary system design of a hardware accelerator with a hierarchical NoC architecture including the core-level NoC, in accordance with various embodiments.

DETAILED DESCRIPTION

Embodiments described herein provide hardware devices and accelerators with a hierarchical Network-on-Chip (NoC) architecture to facilitate different types of data migrations among different components.

In the following description, specific, non-limiting embodiments of the present invention will be described with reference to the drawings. Particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope, and contemplation of the present invention as further defined in the appended claims.

Figure 1A:
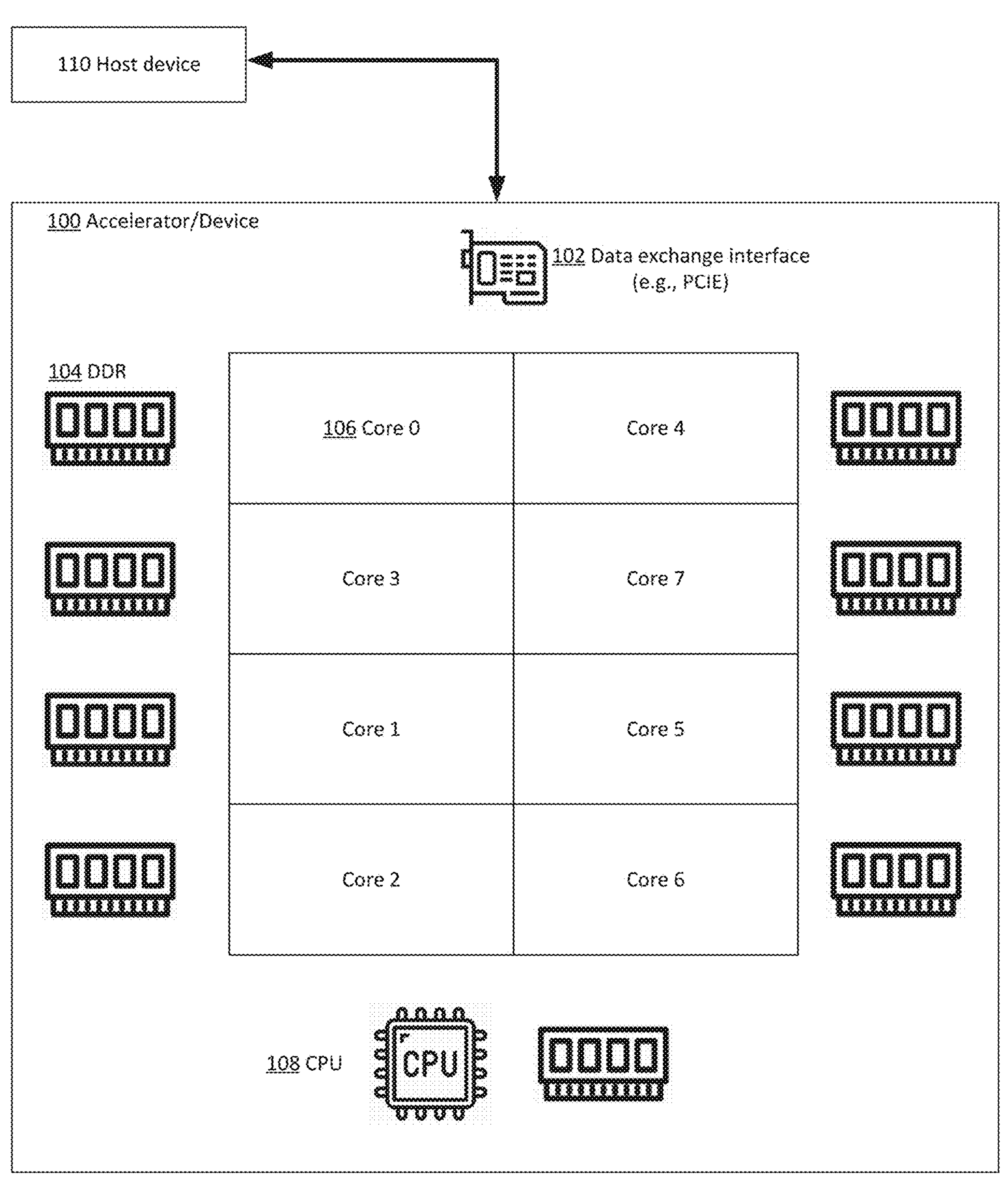
FIG. 1A illustrates an exemplary diagram of a hardware accelerator for neural network computations in accordance with various embodiments.

FIG. 1A illustrates an exemplary diagram of a hardware accelerator 100 for neural network computations in accordance with various embodiments. The accelerator 100 in FIG. 1A is configurable to perform common neural network computations such as convolution computations and vector operations using the same hardware components. FIG. 1A illustrates some hardware components in the accelerator 100, such as a plurality of neural network (NN) cores 106 (FIG. 1A illustrates 8 NN cores), a processing unit (FIG. 1A illustrates a CPU as an example, which may be replaced with another type of processor), memories (e.g., Double Data Rate (DDRs)), a data exchange interface connecting the accelerator 100 with a host device 110. Depending on the implementation, the accelerator 100 may include additional components such as data pre-processing circuit and post-processing circuit to perform parts of the neural network computations.

In a typical setup, the host device 110, such as a computer or a mobile device, runs a neural network software and manages the overall computation process, while the accelerator 100, such as a specialized hardware device implemented as an Application-Specific Integrated Circuit (ASIC) or a Field-Programmable Gate Array (FPGA), helps to accelerate the computation of the neural network by performing complex mathematical operations at a much faster rate than the host device. In some embodiments, the data exchange between the host device 110 and the accelerator 100 may be through a Peripheral Component Interconnect Express (PCIe).

Figure 1B:
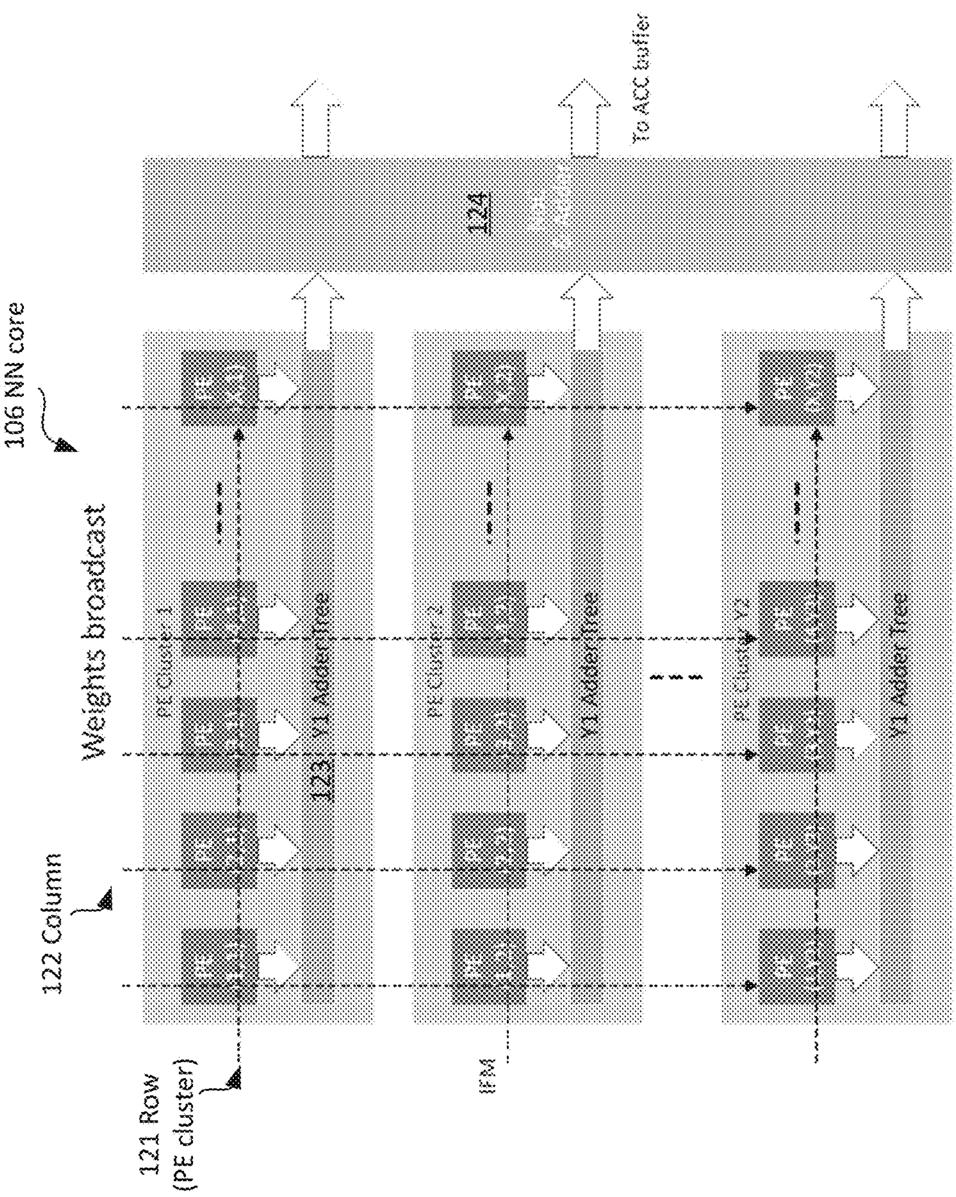
FIG. 1B illustrates an exemplary architecture of an NN core in accordance with various embodiments.

In some embodiments, each of the NN cores 106 in the accelerator 100 may include a plurality of processing entities (PEs) arranged in clusters. Referring to FIG. 1B for an exemplary architecture of an NN core 106. Note the arrangement of the PEs in the NN core 106 in FIG. 1B is for illustrative purposes and may be implemented in other ways depending on the use case.

As shown on the left portion of FIG. 1B, the NN core 106 may include a matrix of PEs. Each PE may include a plurality of multipliers (MUL gates). The multipliers within each PE may work in parallel, and the PEs within the NN core 106 may work in parallel. In FIG. 1B, the number of columns 122 of PEs in the NN core 106 is denoted as X, the number of rows 121 of PEs in the NN core 106 is denoted as Y2, and the number of multipliers within each PE is denoted as Y1. Each row 121 of PEs may be referred to as a PE cluster, and each PE cluster may be coupled to Y1 Adder-trees 123 for aggregating the partial sums generated by the multipliers within the PE cluster. The aggregation results from the Adder-trees 123 across all PE clusters (total Y1×Y2 Adder-trees) may be fed into an Adder 124 for aggregation. The adder 124 may refer to a digital circuit performing the addition of numbers.

Referring back to FIG. 1A, the data movement during neural network computations in the accelerator 100 may occur at three levels.

At the highest level, the host device 110 may send data to the accelerator 100 and obtain certain outputs from the accelerator 100. The data from the host device 110 may be stored in the DDRs 104 (or other types of memories) coupled to the NN cores, and the accelerator 100 may retrieve data from the DDRs 104 and return them to the host device 110.

At the intermediate level, the plurality of NN cores 106 may need to exchange data as part of the computations. For instance, when a neural network processes a large image (e.g., an 8K image), the data (e.g., pixels) is too large to fit in any local DDRs of the NN cores. A common way is to segment the image into small pieces and distribute them among the local DDRs of the NN cores for parallel processing. During the subsequent matrix operations (e.g., convolutions), all weights may be needed for the computation, and thus each core may need to cast (e.g., broadcast, multicast, or unicast) its local data to some other cores.

At the lowest/most inner level, the plurality of PE clusters within each NN core may exchange data. For example, when performing convolution operations using a large filter matrix (e.g., 3*3 or 5*5) and a smaller stride, multiple neighboring PE clusters may have overlapping data to process. In these cases, one PE cluster may multicast its data to its neighboring PE clusters.

Figure 2:
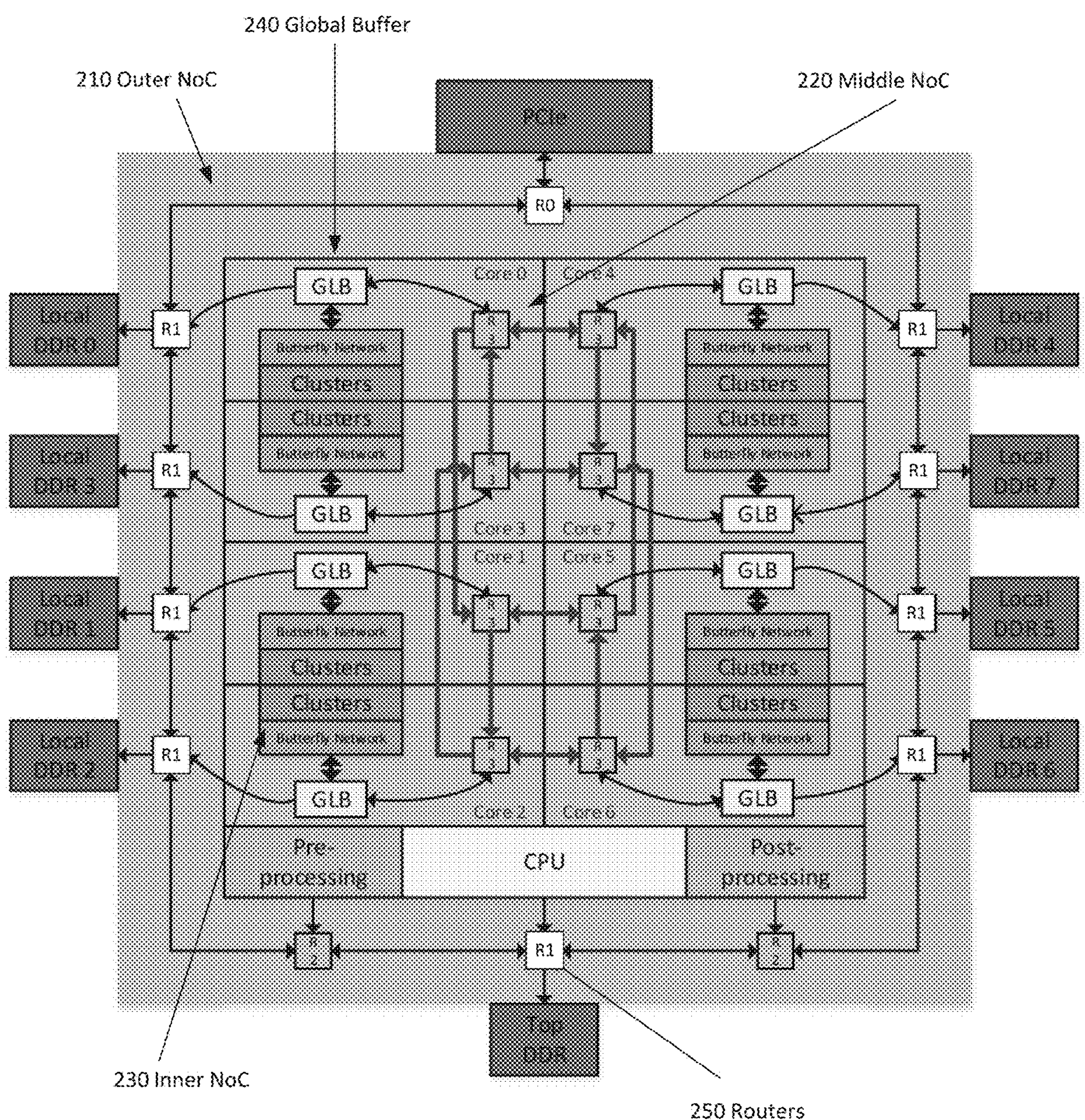
FIG. 2 illustrates an exemplary architectural diagram of a hierarchical NoC within a hardware accelerator, in accordance with various embodiments.

FIG. 2 illustrates an exemplary architectural diagram of a hierarchical NoC within a hardware accelerator 200, in accordance with various embodiments. The accelerator 200 maps to the accelerator 100 in FIG. 1A and includes more details about the hardware components. For instance, each NN core in FIG. 2 includes a global buffer (GLB) shared by the PE clusters therein. The DDRs coupled with the NN cores are labeled as local DDRs, and the DDR coupled with the CPU is labeled as a top DDR. Here, the DDR coupled to a core or CPU refers to a dedicated memory that is accessible only by the coupled core or CPU.

The accelerator 200 may also include a pre-processing circuit and a post-processing circuit to assist the CPU to perform data pre-processing and post-processing as part of the neural network computation. Some pre-processing tasks may include normalization (scaling the input data so that it has a mean of 0 and/or a standard deviation of 1), feature scaling (scaling the input data so that all the features are on a similar scale), and one-hot encoding (converting categorical data, such as labels, into a format that can be understood by the neural network). Some post-processing tasks may include denormalization (reversing the normalization process by multiplying the data by the standard deviation and adding the mean), inverse feature scaling (reversing the feature scaling process by multiplying each feature by its maximum value), and converting one-hot encoded data back to its original format.

In some embodiments, the hardware accelerator 200 includes a hierarchical NoC architecture with multiple levels of NoCs, with each level of NoC being optimized for the workload/data movement occurring at a specific level. Using the accelerator 200 in FIG. 2 as an example, the data movements may occur (1) between the host device and the NN cores in the accelerator, (2) among the NN cores, and (3) inside each NN core (among the PE clusters within the NN core). The workloads at these different levels exhibit different patterns and thus demand different NoC designs.

In some embodiments, the hierarchical NoC architecture in the accelerator 200 may include three layers of NoCs: an outer-layer NoC 210, a middle-layer NoC 220, and an inner-layer NoC 230.

The outer-layer NoC 210 may be configured to transfer data between a host device (e.g., the host device 110 in FIG. 1A) and the DDRs associated with cores and the CPU inside the accelerator 200 through the data exchange interface (e.g., PCIe in FIG. 2). The outer-layer NoC 210 may be bi-directional ring-shape data link connected by routers labeled R0, R1, and R2 in FIG. 2. In an example, the R1 routers each include four ports: one connected to an NN core (or the CPU), one connected to the DDR corresponding to the NN core (or the CPU), and the other two connected to two neighboring routers on the ring-shape data link. The R2 routers each include three ports: one connected to the pre-processing or post-processing circuits, and the other two connected to two neighboring routers on the ring-shape data link. The R0 router includes three ports: one connected to the PCIe interface, and the other two connected to two neighboring routers on the ring-shape data link.

In some embodiments, the data can move in both directions in the outer-layer NoC, and the outer-layer NoC works in a transaction mode. In the transaction mode, a hardware component may be a transaction initiator that initiates a data write request or a data read request. For instance, the PCIe may be an initiator that reads from or write to one or more of the DDRs associated with the NN cores. Making the outer-layer NoC support transaction mode is because the data movement among the host device, the NN cores, and the CPU is more diversified than the inner layers (e.g., the inner layers may require to support more limited data movements such as split and broadcast, but the data movement at the outer layer can be between any two components and in any direction).

In some embodiments, the middle-layer NoC 220 may be configured to transfer data among the plurality of NN cores in the accelerator 200 (e.g., 8 NN cores (core 0 to core 8) in FIG. 2). For this reason, this middle-layer NoC 220 may also be referred to as core-level NoC. The core-level NoC 220 includes a plurality of uni-directional ring-shape data links, and each uni-directional ring shape data link links a subset of the cores. In particular, in a logic view, the plurality of NN cores (along with the corresponding routers) may be organized as a matrix, and each row of the matrix includes the same number of cores with corresponding routers. Each row of cores in the matrix is connected with a first uni-directional ring-shape data link through corresponding routers and every two adjacent first uni-directional ring-shape data links are in opposite directions. Similarly, each column of cores in the matrix is connected with a second uni-directional ring-shape data link through corresponding routers and every two adjacent second uni-directional ring-shape data links are in opposite directions. In this disclosure, "the cores are connected" is a simplified expression for "each core has its own router, and the cores are connected through their respective routers." A person skilled in the art would appreciate that "the cores are connected in a uni-directional ring-shape data link" implies that "the corresponding routers are also connected in a uni-directional ring-shape data link." FIGS. 3A, 3B, 4A, and 4B illustrate different examples of core-level NoC with different numbers of NN cores.

In some embodiments, the inner-layer NoC 230 may be configured within each NN core to cast (e.g., broadcast, multicast, or unicast) data among the plurality of PEs clusters within the core for implementing matrix operations. In some embodiments, the inner-layer NoC 230 may include a cross-bar network connecting a global buffer of the core to the plurality of PE clusters within the core. The cross-bar network may include multiple butterfly networks for performing different types of datacasting on different types of data (e.g., one-to-all broadcasting or one-to-neighboring PE cluster multicasting or broadcasting).

In terms of the bandwidth for data transmission, the inner-layer NoC 230 handles the most frequent data movements and thus has the highest bandwidth. The frequency of data movement at the outer-layer NoC 210 may be the lowest so it has the lowest bandwidth among all the layers. The inner-layer NoC 230 achieves the highest bandwidth by providing direct links from the source (e.g., a global buffer of a NN core) and the target (e.g., PE clusters within the NN core).

Figure 3A:
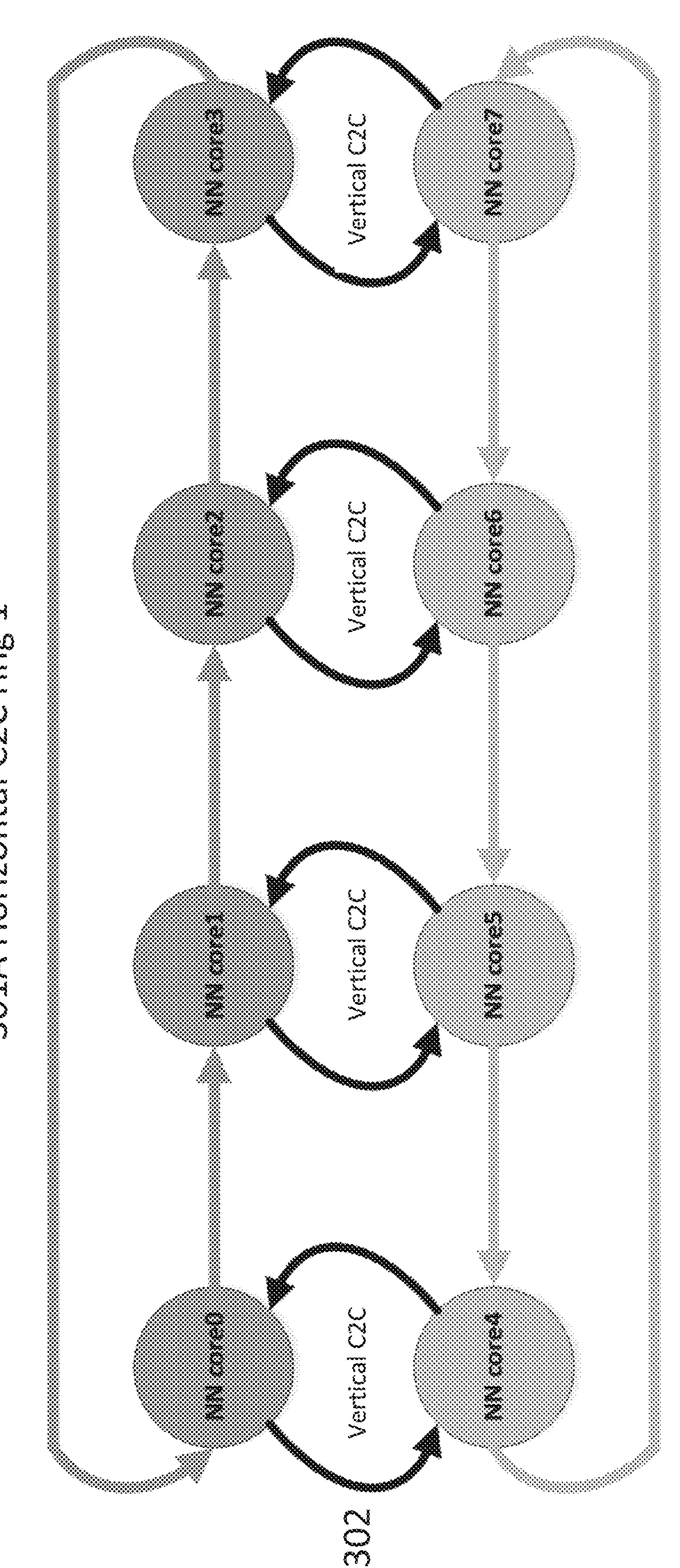
FIG. 3A illustrates a logical view of an exemplary core-level NoC in a hardware accelerator, in accordance with various embodiments.

FIG. 3A illustrates a logical view of an exemplary 4×2 core-level NoC in a hardware accelerator, in accordance with various embodiments. The exemplary core-level NoC in FIG. 3A includes 8 NN cores that are grouped into two groups of 4 cores and arranged in two rows and four columns.

In the row direction of the NoC in FIG. 3A, the NN cores 0~3 are connected with a horizontal C2C (core to core) ring 1 301A (e.g., the first uni-directional ring-shape data link) and the NN cores 4~7 are connected with another horizontal C2C (core to core) ring 2 301B. Note that ring 1 301A and ring 2 301B are in opposite directions.

In the column direction of the NoC in FIG. 3A, each column includes two NN cores (e.g., core 0 and core 4 in the first column) that are connected with a vertical C2C ring. Since there are only two NN cores in each vertical C2C ring and each core has one input link and an output link, the "two adjacent rings having opposite directions" requirement is met by the vertical rings but they may appear as bi-directional C2C links in FIG. 3A.

Figure 3B:
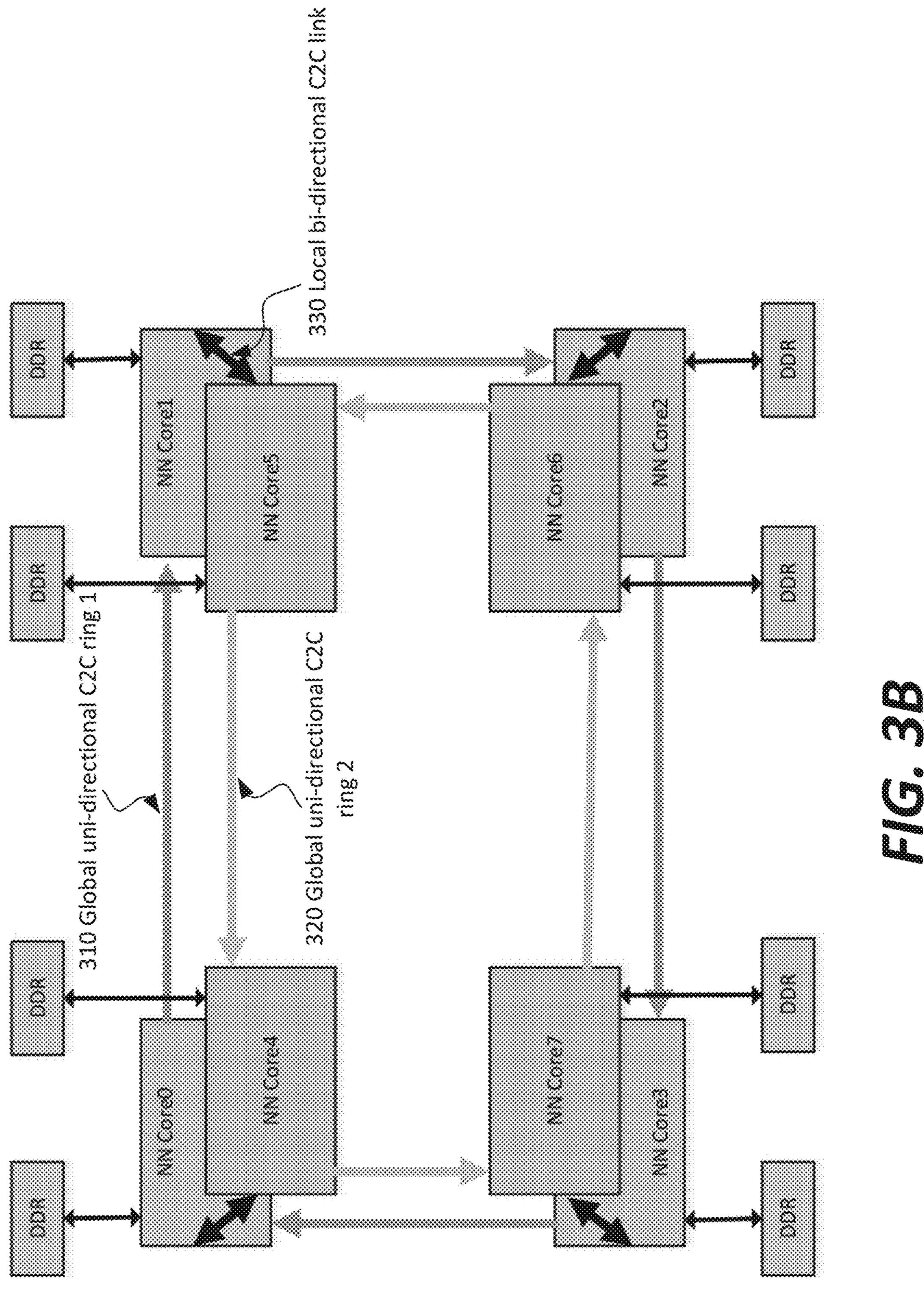
FIG. 3B illustrates a system view of the exemplary core-level NoC from FIG. 3A, in accordance with various embodiments.

FIG. 3B illustrates a system view of the exemplary 4×2 core-level NoC from FIG. 3A, in accordance with various embodiments. Corresponding to the logical view of the NoC in FIG. 3A, cores 0-3 in FIG. 3B are connected by the uni-directional core-to-core (C2C) ring 310 (the clock-wise ring), and cores 4-7 are connected by the uni-directional C2C ring 320 (the counter clock-wise ring). The cores 0-3 respectively correspond to cores 4-7, and each pair of the corresponding cores (e.g., core 1 and core 5) are connected with a bi-directional C2C link 330. Different from the transaction mode of the outer-layer NoC 210 in FIG. 2, the core-level NoC works in a streaming mode, in which data is transferred from a sender to a receiver. The streaming mode does not require the semantics for initiating a transaction (e.g., in transaction mode) to define the target or confirm the delivery of the data. The reason behind this design is that the cores in the accelerator may need to cast their local data to other cores at a fast speed with predictable/consistent latencies. By using these uni-directional ring-shape data links (with opposite directions between adjacent links), the casting from any core to the rest of the cores would go through the same length of wiring and thus has consistent latencies. More details on routing are illustrated in FIGS. 4B-8.

Figure 4A:
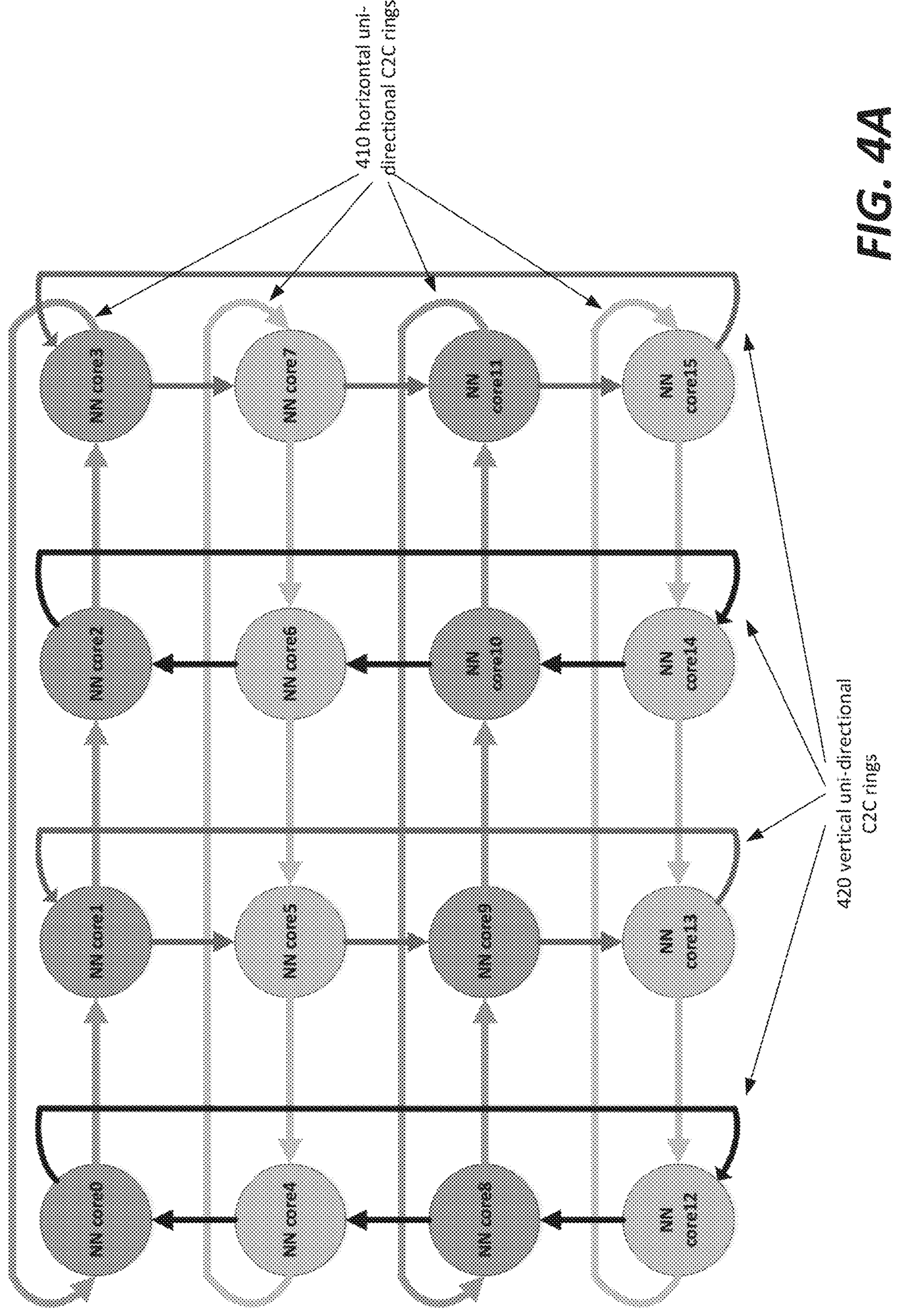
FIG. 4A illustrates a logical view of another exemplary core-level NoC in a hardware accelerator, in accordance with various embodiments.

FIG. 4A illustrates a logical view of another exemplary 4×4 core-level NoC in a hardware accelerator, in accordance with various embodiments. As shown, the NoC in FIG. 4A includes 16 cores that are grouped into four rows of 4 cores in a 4×4 matrix.

In the row direction of the NoC in FIG. 4A, each row of cores are connected with a horizontal C2C (core to core) ring 1 401 (e.g., the first uni-directional ring-shape data link). The adjacent horizontal rings 410 (e.g., the ring for the first row and the ring for the second row) are opposite in direction.

In the column direction of the NoC in FIG. 4A, each column of rows are connected with a vertical uni-directional C2C ring 420. The adjacent vertical rings 420 (e.g., the ring for the first column and the ring for the second column) are opposite in direction.

FIG. 4B illustrates a wiring diagram of the exemplary 4×4 core-level NoC from FIG. 4A, in accordance with various embodiments. The system view shows an example wiring and core placement diagram of the 4×4 core-level NoC. One of the primary goals of the wiring and core placement is to make sure the overall wire distance (i.e., data migration distance) from any given core to the other cores in the same (horizontal or vertical) ring is consistent.

To achieve this goal, instead of wiring the cores in the same row or column strictly following the logic order of the cores in FIG. 4A, the core connections in the same row or column use "skip-over and one" connections. As illustrated in FIG. 4B in the first row, when connecting cores 0-3 in a horizontal uni-directional ring, core 0 is connected to core 1 using a "skip-over" connection, and then core 1 is connected to core 2 using a "one" connection, and then core 2 is connected to core 3 using another "skip-over" connection, and lastly, core 3 is connected to core 1 using another "one" connection. Here, the "one" connection means the connection has direct wiring between the two cores without skipping any other core, and the "skip-over" connection means the connection skips over another core and thus has a longer wiring distance than the "one" connection. To achieve this "skip over" and "one" alternating wiring architecture, the cores need to be placed to accommodate the "skip-over" connections. As shown, cores 0-3 are placed in the following order: core 0, core 3, core 1, and core 2, such that core 0 can have a "skip-over" connection (skipping over core 3) to core 1, and core 2 can have a "skip-over" connection (skipping over core 1) to core 3.

The above-described core placement and wiring architecture allow consistent data travel distance for data broadcasting in the NN accelerators among the NN cores. Taking the first row of the NoC in FIG. 4B as an example, data broadcasted from core 0 to cores 1-3 would travel through two "one" connections and two "skip-over" connections, and data broadcasted from core 3 to cores 0-2 would also travel through two "one" connections and two "skip-over" connections. If the cores are connected by strictly following the logical order as FIG. 4A, the data broadcasted from core 0 to cores 1-3 would travel through three "one" connections, but the data broadcasted from core 3 to cores 0-2 would travel through one "skip-two" connection (e.g., from core 3 to core 0 by skipping core 1 and core 2) and two "one" connections. Consistent data travel distances and data transfer latencies for broadcasting data from any of the NN cores simplify job synchronization among parallel processing tasks, and are therefore critical for neural network computations using the accelerator.

Figure 5A:
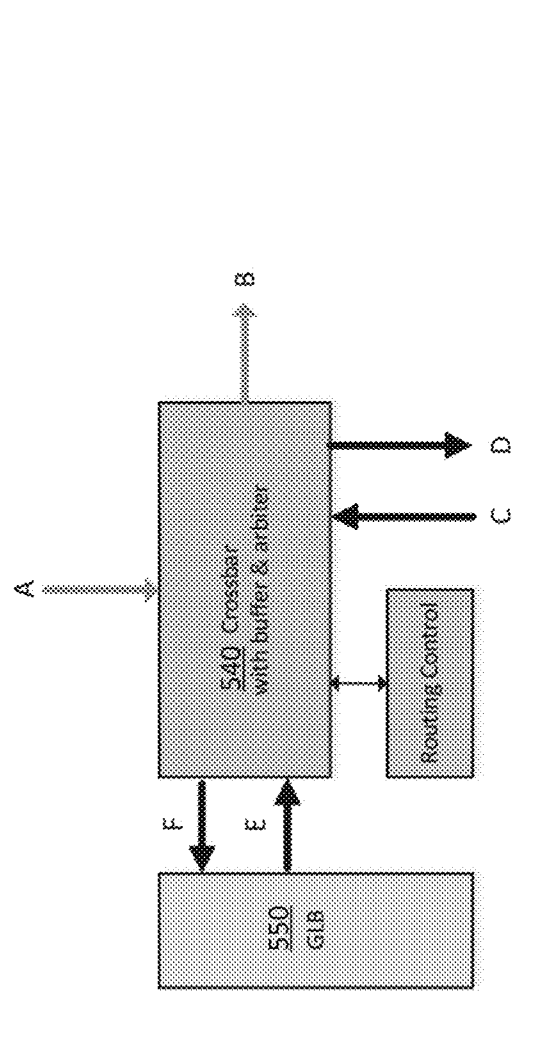
FIG. 5A illustrates an exemplary router and a corresponding routing table for a core-level NoC in a hardware accelerator, in accordance with various embodiments.
Figure 5A:
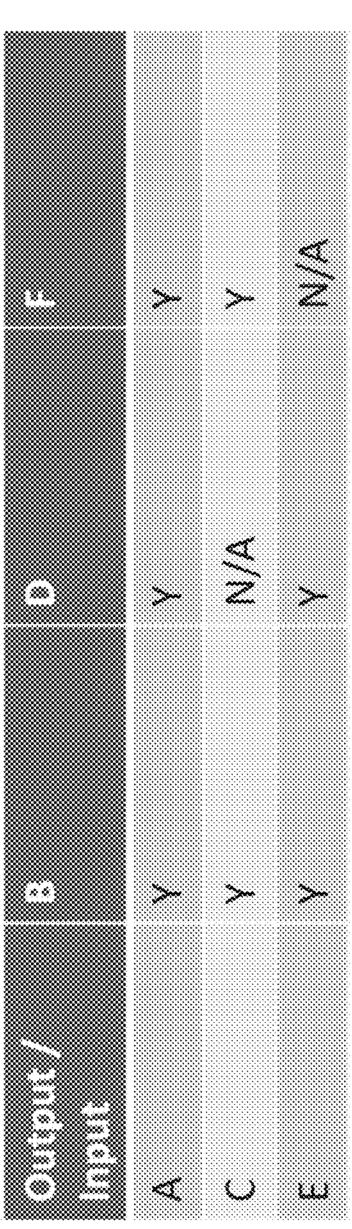

FIG. 5A illustrates an exemplary router and a corresponding routing table for a core-level NoC in a hardware accelerator, in accordance with various embodiments. The NN cores in a neural network accelerator may form the above-described core-level NoC through a plurality of interconnected routers 540. The routers 540 may manage receiving data, sending out data, reading data from or storing data into the buffers of the cores, and determining routing based on routing algorithms. For example, each router 540 may include a crossbar (e.g., with a buffer and arbiter) for managing the data flow and a routing control circuit for managing the routing logic. In some embodiments, the routing control circuit may be configured to: convert a physical address of the router to a first logical address; in response to the router receiving a data package for routing to a target router, convert a physical address of the target router into a second logical address; determine a routing port of the router based on the first and second logical addresses; and route the data package through the routing port of the router.

In particular, the router 540 of an NN core may have three sets of ports. The first two ports, e.g., A and B, may be used by a horizontal (row-wise) uni-directional ring-shape C2C ring in which the NN core is located. The next two ports, e.g., C and D, may be used by a vertical (column-wise) bi-directional C2C ring in which the NN core is located. The router 450 may further have two ports, e.g., E and F, to read from and write to a global buffer (GLB) 550 associated with the NN core. Here, the "global buffer" is an internal buffer of the NN core, and the "global" in its name is to indicate that this buffer is shared by all PE clusters within the NN core.

The routing table in FIG. 5A shows possible routing options for data received from different ports. For instance, if data is received from port A (e.g., data from another NN core on the same horizontal ring), it may be output to ports B, D, and F, according to the routing control logic. If data is received from port C (e.g., data from another NN on the same vertical ring), it may be output to ports B and F, but not D. If data is received from port E (e.g., read from its associated GLB), it may be output to ports B and D, but not F. These logics may be programmed into the routing control module to prevent data from flowing back to the source (e.g., data from port C should not be allowed to output to port D). In the following description, each set of ports may be referred to as a port for simplicity, e.g., e.g., A and B may be called a port corresponding to the horizontal ring.

Figure 5B:
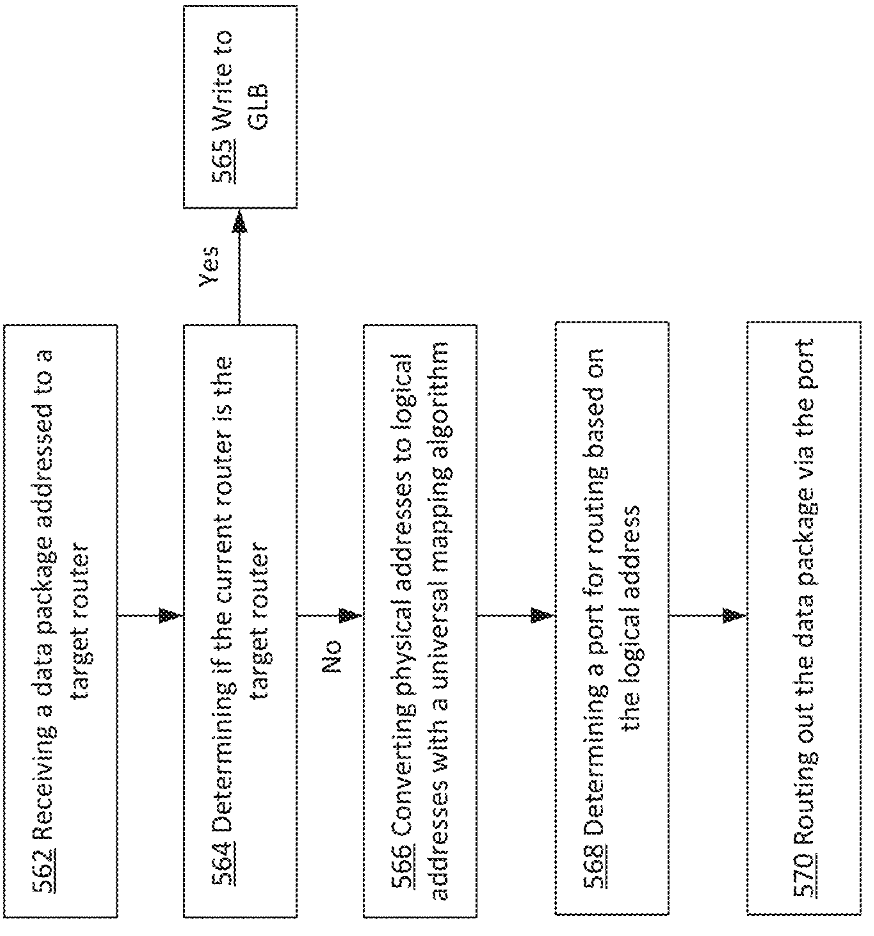
FIG. 5B illustrates an exemplary routing method for a core-level NoC in a hardware accelerator, in accordance with various embodiments.

FIG. 5B illustrates an exemplary routing method for a core-level NoC in a hardware accelerator, in accordance with various embodiments. Using the router architecture illustrated in FIG. 5A as an example, the routing method in a router is to determine whether to (1) access the local buffer of the corresponding core through its local ports (e.g., E or F) or (2) transfer the received data out through one of the external ports (e.g., B or D).

The example routing method in a NN core's router illustrated in FIG. 5B may start with receiving a data package addressed to a target router at step 562. The data package may be broadcasted, multi-casted, or unicasted by another NN core as a part of parallel processing in neural network computation.

At step 564, the router may determine whether the current router is the target router based on the physical address associated with the data package. If the router is the target router, the data package may be written into the GLB of the NN core at step 565. If the router is not the target router, the routing method continues to determine which external ports to route the data package.

At step 566, physical address to logical address conversion occurs. First, the physical address of the current router is converted into a predetermined (fixed) logical address. Second, the physical address of the target router is converted into a logical address based on the predetermined logical address of the current router and its relative location to the current router.

At step 568, the router may apply a routing algorithm to determine a port for routing the data package based on the logical address of the target router. For example, the routing algorithm may include constructing an address mask for each of the external ports of the current router. Each address mask may be a bit map indicating which routers are reachable through the specific port within a predetermined distance. By applying the address masks to the logical address of the target router, the port leading to the target router may be identified. Subsequently, the data package may be routed out through the port at step 570.

Figure 6A:
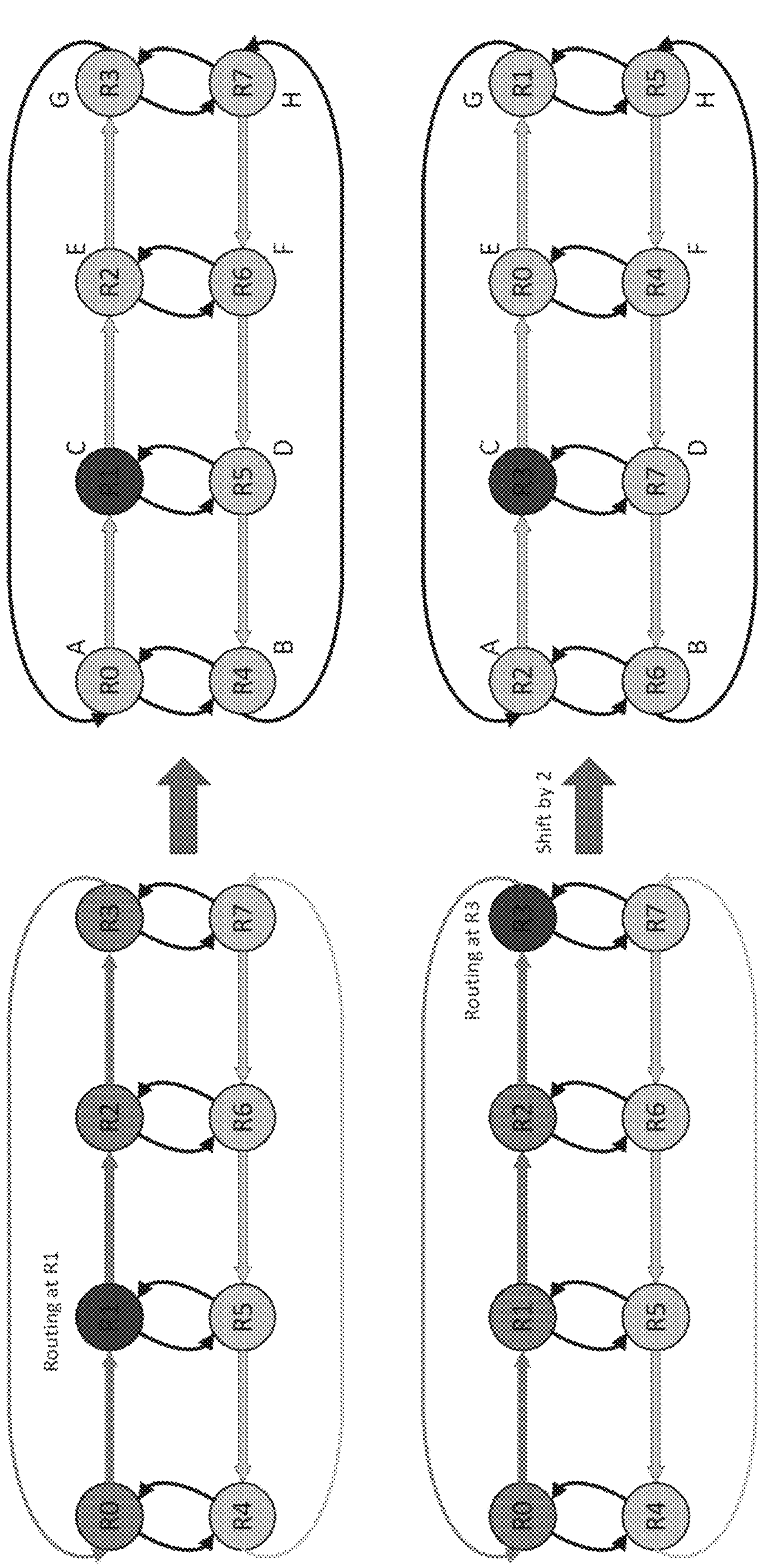
FIG. 6A illustrates an exemplary process of router address translation in a core-level NoC within a hardware accelerator, in accordance with various embodiments.
Figure 6B:
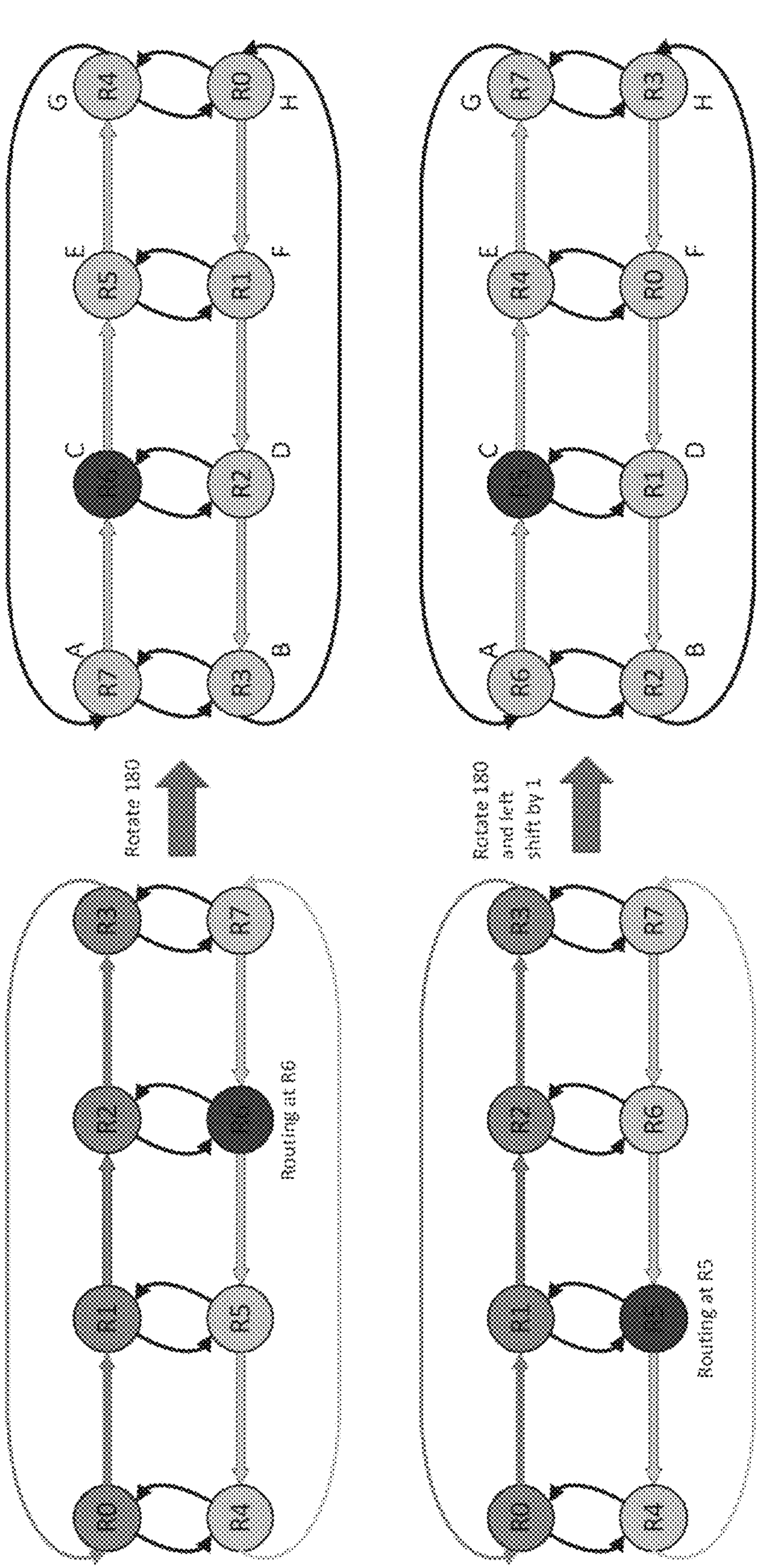
FIG. 6B illustrates another exemplary process of router address translation in a core-level NoC within a hardware accelerator, in accordance with various embodiments.

FIG. 6A illustrates an exemplary process of router address translation in a core-level NoC within a hardware accelerator, in accordance with various embodiments. Router address translation is one of the first steps for routing a data package at a router. It involves translating the physical addresses of at least the current router and the target router into logical addresses in order to apply the routing algorithm. The output of the routing algorithm determines which port of the router to use for routing the data package. This address translation step corresponds to step 566 of the routing method illustrated in FIG. 5B.

In some embodiments, the physical address of the current router (the router that received the data package for routing) may be translated into a predetermined logic address. This predetermined logic address is used by all routers participating in the same NoC when translating their own physical addresses into logical addresses. As the examples illustrated in FIG. 6A, if the routing occurs at router R1, a logical address "C" is assigned to R1, i.e., the physical address of R1 is translated into "C"; if the routing occurs at router R3, the same logical address "C" is assigned to R3, i.e., the physical address of R3 is translated into "C." This translation step may be implemented in various ways. For instance, the translation logic may be implemented within each router (e.g., using a routing control circuit) or by a CPU in the NN accelerator that manages all the routers.

After the current router obtains its logical address, the other routers, including the target router, may be assigned with logical addresses based on their locations relative to the location of the current router and the predetermined logical address of the current router.

In some embodiments, in order to assign the predetermined logical address to the current router, the NoC needs to go through transformation operations so that the current router is placed at a predetermined location. As shown in FIG. 6A, the router needs to be located at the second place in the first row in order to be assigned with the logical address "C." This transformation process may include performing one or more transformation operations on the NoC matrix to move the given router to the predetermined location corresponding to the predetermined logical address. The transformation operations may include rotating the NoC (e.g., by 180 degrees) and shifting the NoC left or right.

For example, in FIG. 6A, when routing at router R3, R3 needs to be moved from its original location in the NoC (the fourth place in the first row) to the predetermined location (the second place in the first row) by shifting the NoC by 2 steps. As another example, in FIG. 6B, when routing at router R6, R6 needs to be moved from its original location in the NoC (the third place in the second row) to the predetermined location (the second place in the first row) by rotating the NoC matrix by 180 degrees. As yet another example, in FIG. 6B, when routing at router R5, R5 needs to be moved from its original location in the NoC (the second place in the second row) to the predetermined location (the second place in the first row) by rotating the NoC matrix by 180 degrees and left shifting by 1 step.

FIG. 7A illustrates an exemplary routing algorithm for a core-level NoC in a hardware accelerator, in accordance with various embodiments. As described above, when a router receives a data package for routing to a target router, address translations may be performed first. Once the routers are assigned with logical addresses (i.e., once the physical addresses of the routers are translated into the logical addresses), the routing control circuit may determine which port of the router to use to route the data package out. Each router has three output ports: the first output port corresponds to the horizontal ring in which the router is located, the second output port corresponds to the vertical ring in which the router is located (when the NoC is 4×2, the vertical ring is also called local C2C ring), and a third output port corresponds to the internal buffer of the core for writing data.

The routing control circuit may construct address masks for all three ports of the router. Each address mask may be a bit map with bits corresponding to the logical addresses of the routers in the NoC. If a bit in the bit map for a port is set to 1, it indicates the corresponding router should be routed through the port. More details on the address masks are described in FIGS. 8A and 8B.

Using the 4×2 NoC 700 illustrated in FIG. 7A as an example, if the target router has a logical address of A or B or D, then the output port corresponding to the vertical ring (e.g., port D in FIG. 5A) will be used for routing. If the target router has a logical address of E or For G or H, the output port corresponding to the horizontal ring (e.g., port B in FIG. 5A) will be used for routing. If the target router has a logical address of C, the output port corresponding to the internal buffer (e.g., port F in FIG. 5A) will be used for routing.

Figure 7B:
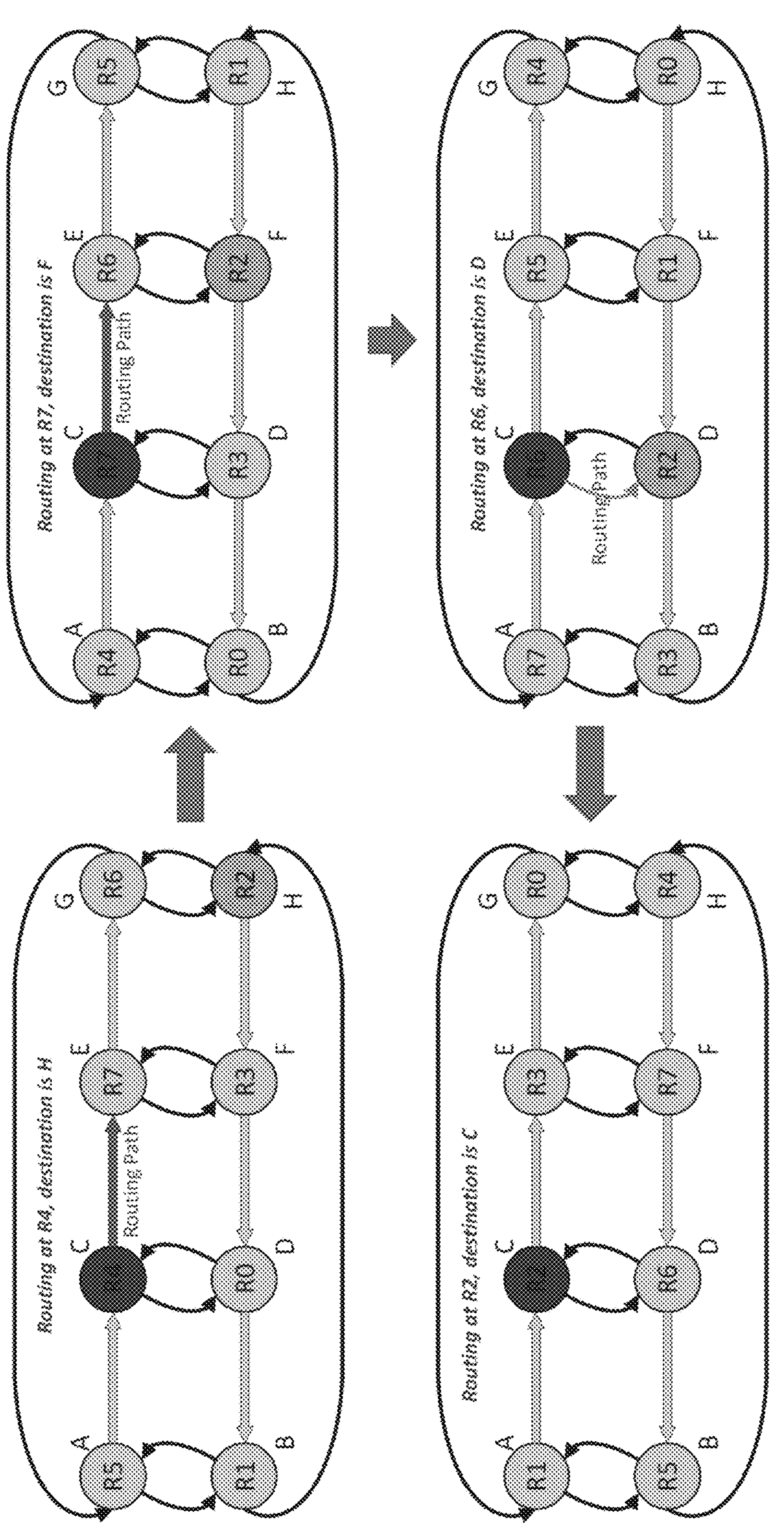
FIG. 7B illustrates an exemplary routing process for a core-level NoC in a hardware accelerator, in accordance with various embodiments.

Example 720 in FIG. 7A illustrates a routing task from R4 to R2. The task may be executed with the following steps: reading data from the internal buffer of the core coupled to R4, routing the data out through the horizontal ring output port of R4 to R7, routing the data out through the horizontal ring output port of R7 to R6, routing the data out through the vertical ring output port of R6 to R2, and routing/writing the data to the internal buffer of the core coupled to R2. During this process, R7 and R6 are bypassed. FIG. 7B illustrates how this task execution is carried out by using the address translation and routing algorithm.

FIG. 7B illustrates an exemplary routing process for a core-level NoC in a hardware accelerator, in accordance with various embodiments. The routing task is to route a data package from router R4 to router R2. Before the routing algorithm is applied, the NoC goes through a transformation process (e.g., rotating and/or shifting) in order for the router R4 to be placed at a predetermined location. After the transformation, the router R4 is assigned with the predetermined "origin" logical address (labeled with "C" in FIG. 7B) and the other routers are assigned corresponding logical addresses based on their relative positions to the router R4. Here, the relative positions may be determined based on the routers' physical addresses.

After translating the router addresses into the logical addresses, a routing control circuit may execute the routing algorithm. At the first step, the routing control circuit may determine which port of R4 to route out the data package. R4 has two external ports for routing out the data package and one port for accessing the internal buffer of the coupled core. In particular, the routing control circuit may determine whether to use the external port corresponding to the horizontal ring involving R4 or the external port corresponding to the vertical ring involving R4. According to the example algorithm illustrated in FIG. 7A, the routing control circuit may look at the logical address of the target router R2, i.e., H, applying the address mask of R4, and determine that the port corresponding to the horizontal ring will be used for routing. As a result, the data package is routed to router R7, the router following R4 in the horizontal ring.

Next, the logical address translation in the NoC is updated. This process may include left shifting the NoC by one hop, such that router R7 is at a position to be assigned with the "origin" logical address "C." Correspondingly, the target router R2 may be assigned with logical address "F" based on its physical address. After the transformation and logical address translation, the routing control circuit applies the same algorithm on R7 to determine which port to use. Similar to the last step, the port in R7 that corresponds to the horizontal ring is selected, and the data package is routed to router R6 (the next router in the horizontal ring after R7).

Then the NoC transformation and logical address translation are executed again such that R6 is at the position to be assigned with the logical address "C" and, as a result, R2 is assigned with a logical address "D." According to the routing algorithm in FIG. 7A, the routing control circuit determines that the port of R6 that corresponds to the vertical ring should be used for routing. Now the data package is routed to the target router R2.

At R2, the routing control circuit determines whether the physical address of the target router is the same as its own physical address. If positive, the port of R2 that corresponds to the internal buffer is selected, and the data package is written into the internal buffer through the port.

Figure 8A:
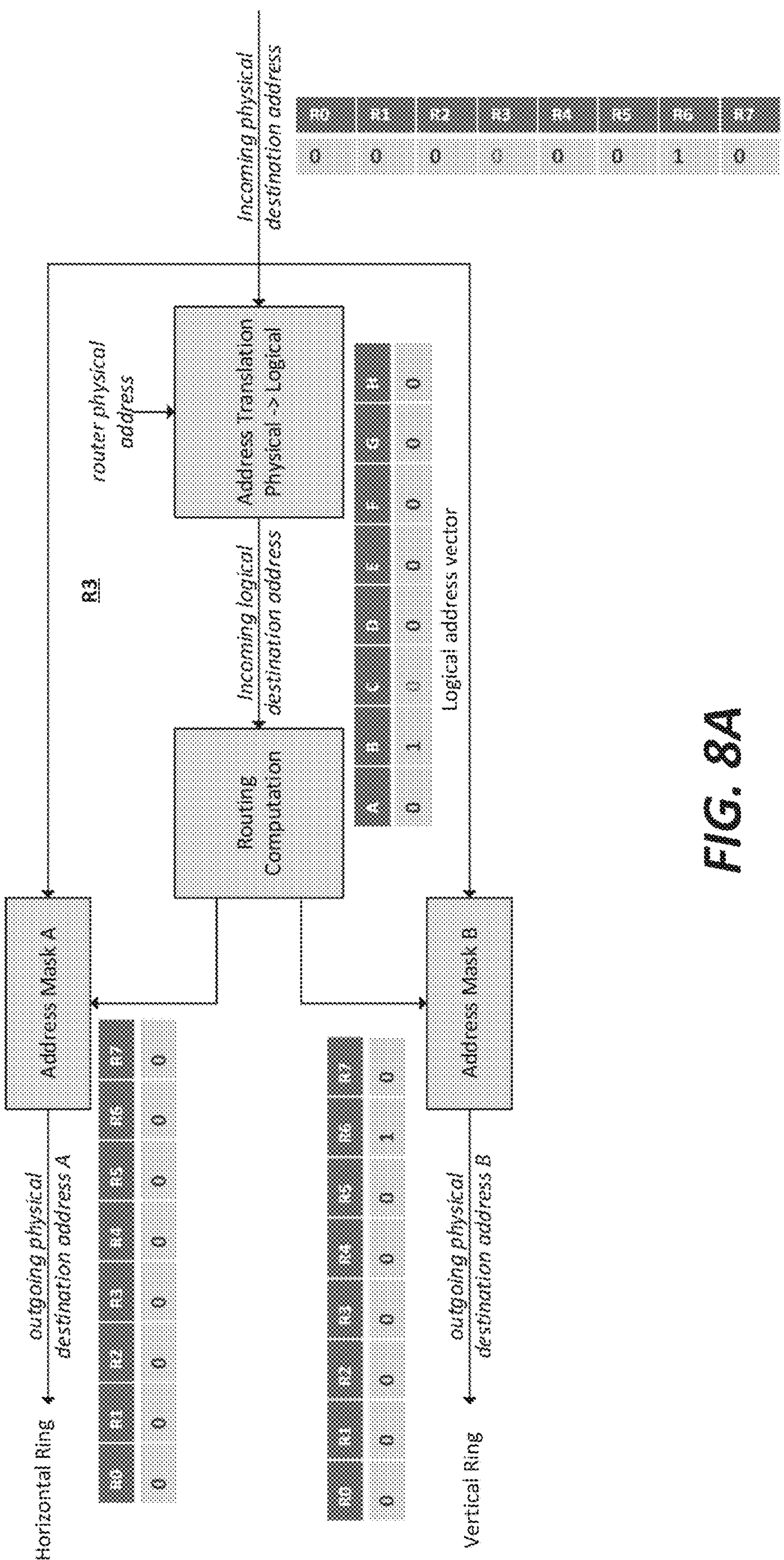
FIGS. 8A and 8B illustrate exemplary routing computation for data unicasting and broadcasting at a core-level NoC in a hardware accelerator, in accordance with various embodiments.
Figure 8B:
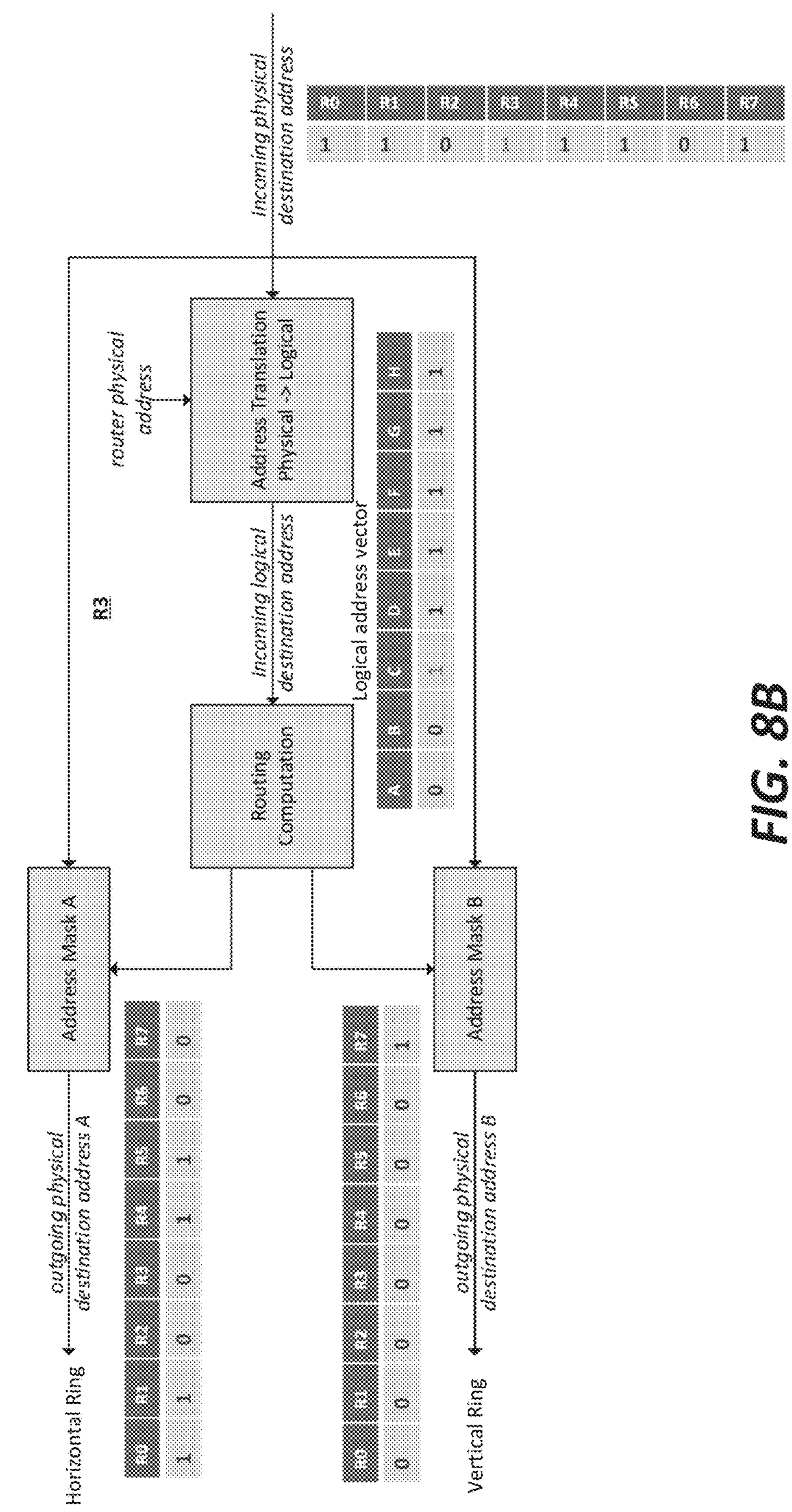

FIGS. 8A and 8B illustrate exemplary routing computation for data unicasting and multicasting at a core-level NoC in a hardware accelerator, in accordance with various embodiments. The unicasting scenario illustrated in FIG. 8A depicts unicasting a data package to router R6 via router R3, and the diagram in FIG. 8A shows the routing process inside R3.

First, the data package is received with an incoming physical destination address vector (e.g., a bit map) indicating the destination router, i.e., R6 in this example. As shown, the physical destination address may be a bit map with the target router being 1.

Second, address translation is executed inside R3 to translate the physical addresses of R3 and R7 into logical addresses. Since the translation is in R3, R3 is assigned with the predetermined "origin" logical address, e.g., "C," and R6 is assigned with a different logical address based on its relative location to R3, e.g., "B" in this use case. A similar process may be applied to other routers and the final output may be a logical address vector (e.g., a bit map, in which the bit(s) with value 1 correspond to the destination router(s)). In some embodiments, as long as the number of cores (thus the number of routers) in the NoC does not change, the physical address to logical address translation in each router may be pre-computed and stored as a static mapping table. Different routers have different static mapping tables. This precomputing method simplifies the design and implementation. The mapping tables may be recomputed when the NoC experiences reconstruction due to defective cores.

After the address translation, the routing algorithm determines which port of R3 to route the data package to base on the logical address vector. This process may use address masks for the ports. Each of the ports of R3 may have an address mask indicating which routers are reachable through the port within a predetermined number of hops (e.g., a number of additional routers to be routed through after being output from the port). This number of hops may not be greater than the number of routers in the NoC, and may be set to a half of the number of routers in the NoC.

For example, the port corresponding to the horizontal ring in which R3 is located may have an address mask A (e.g., a bit map mask), and the port corresponding to the vertical ring in which R3 is located may have an address mask B. After applying the address masks to the logical address vector, the routing algorithm may identify the port to be used for routing the data package. In the unicasting example in FIG. 8A, the port corresponding to the vertical ring is used to route the data package.

In the multicasting (or broadcasting) scenario illustrated in FIG. 8B, the incoming data package is being routed to multiple routers (R0/1/3/4/5/7) via router R3, and thus the physical address vector may have multiple bits being set to 1. While the address translation process and address mask application are the same as FIG. 8A, both external ports of R3 may be used for routing in FIG. 8B. For example, the port corresponding to the horizontal ring is used to route to R0/1/4/5, and the port corresponding to the vertical ring is used to route to R7.

Figure 9A:
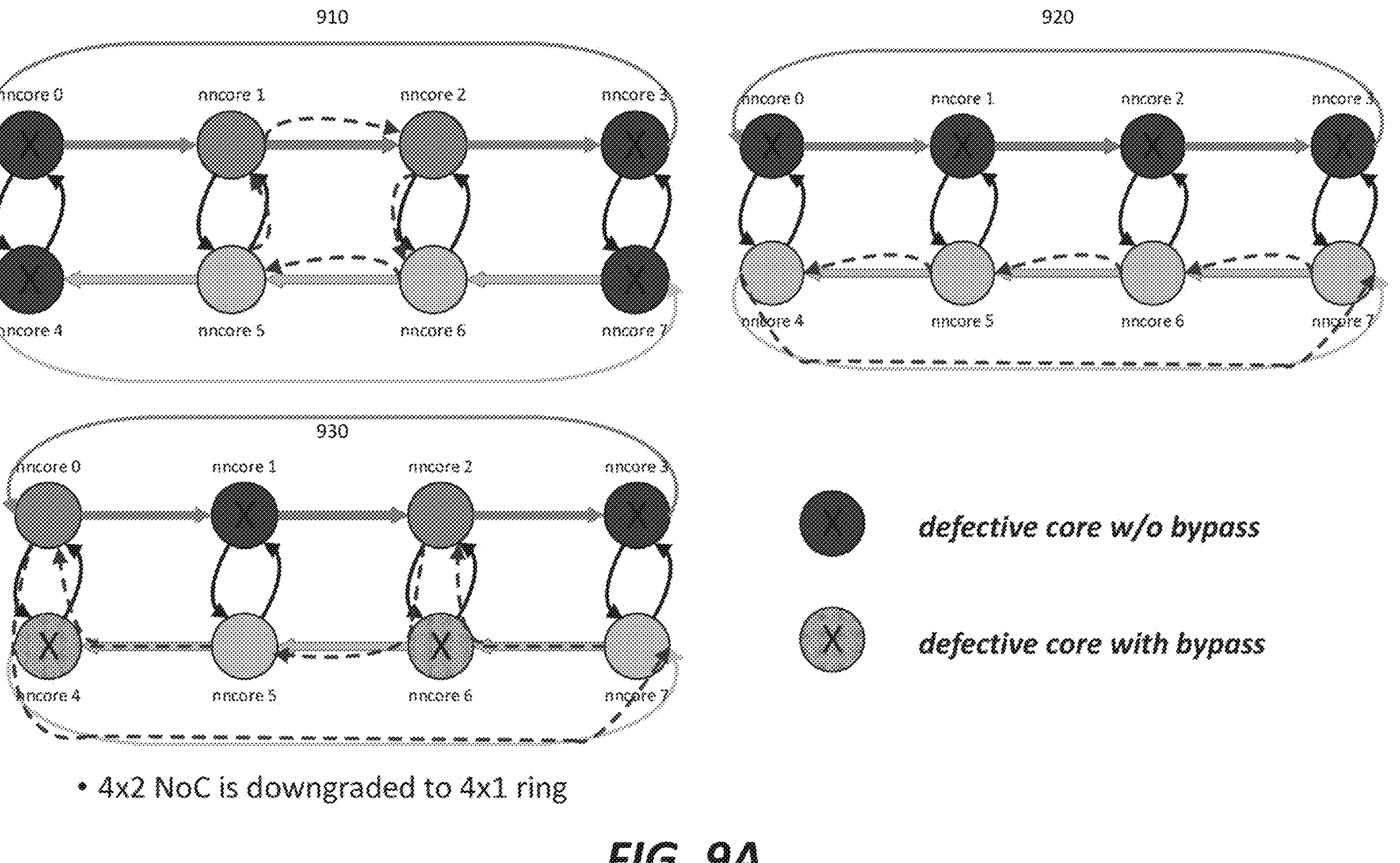
FIG. 9A illustrates exemplary core-level NoC transformations with defective cores, in accordance with various embodiments.

FIG. 9A illustrates exemplary core-level NoC transformations with defective cores, in accordance with various embodiments. The NoC in FIG. 9A is a 4×2 NoC. A core may become defective in different scenarios. For example, if the core, or more specifically, if the router coupled to the core cannot access its internal buffer (e.g., because of defective ports to the internal buffer or defective internal buffer) but still can perform the routing algorithm, it may be deemed as defective with bypass. As another example, if the router coupled to the core had defective ports to the horizontal or vertical rings, it may be deemed defective without bypass.

In some embodiments, the NoC may be downgraded depending on the number of defective cores and their specific defects. In scenario 910 in FIG. 9A, cores 0, 3, 4, and 7 are defective without bypass, the remaining cores may detect the defective neighbors after routing timeout or missed heartbeats. After one core detects that one of its neighboring cores is defective without bypass, it disables the ports corresponding to the neighboring core. For instance, core 5 detects that core 4 is defective without bypass, disables its port for routing data onto the horizontal ring towards core 4, and only leaves its port for the vertical ring towards core 1. After each non-defective core, i.e., cores 1, 2, 5, 6 in FIG. 9A, toggles its ports, the 4×2 NoC is downgraded to a 2×2 NoC.

A similar downgrade occurs in the scenario 920 in FIG. 9A, in which cores 0, 1, 2, and 3 are defective without bypass, and the remaining cores disable their ports to their respective vertical rings. Thus the 4×2 NoC is downgraded to a 1×4 NoC.

In the scenario 930 in FIG. 9A, cores 1 and 3 are defective without bypass and cores 4 and 6 are defective with bypass. If a non-defective core detects its neighboring core is defective with bypass, it keeps its port to the neighboring core open so that the data can still use the route but simply bypass the neighboring core. As shown, core 5 keeps its port to the horizontal ring (towards core 4) open, core 7 keeps its port to the horizontal ring (towards core 6) open, and the 4×2 NoC is now downgraded to 4×1 NoC.

Figure 9B:
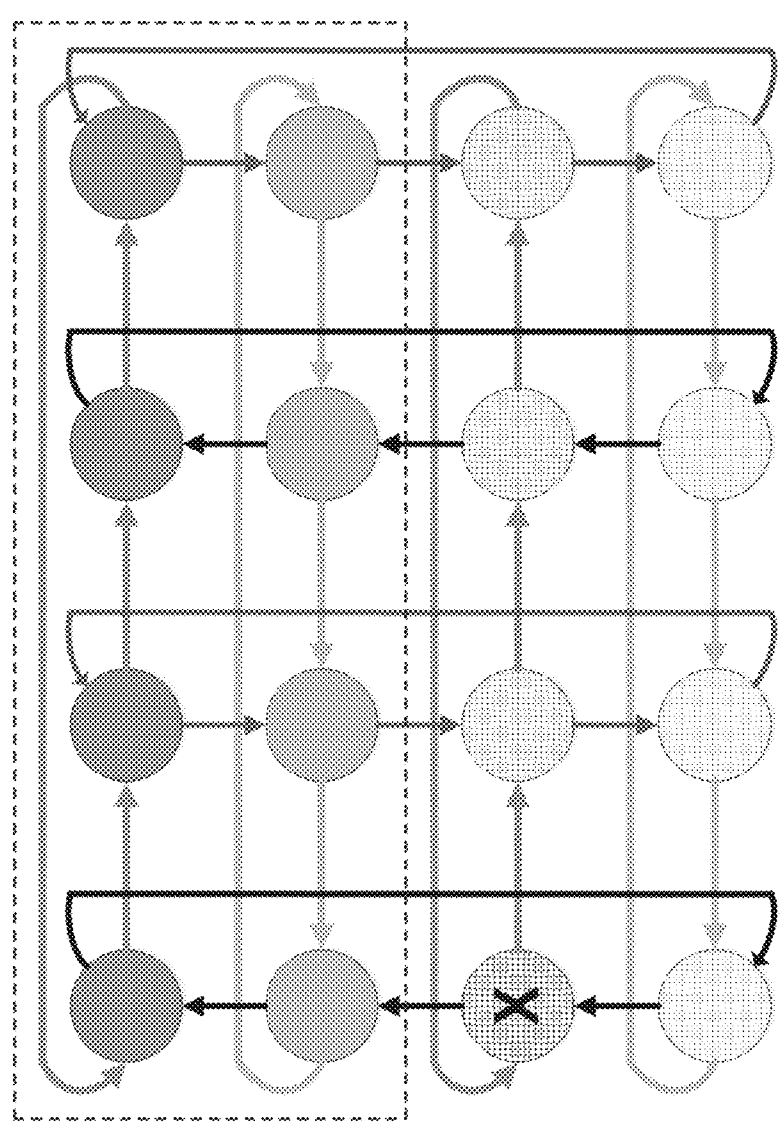
FIG. 9B illustrates another exemplary core-level NoC transformation with defective cores, in accordance with various embodiments.

FIG. 9B illustrates another exemplary core-level NoC transformation with defective cores, in accordance with various embodiments. The NoC in FIG. 9B is a 4×4 NoC, and it is assumed that the cores at the lower half of the NoC are all defective with bypass. In this case, the cores in the second row of the NoC keep their ports to their respective vertical rings open. The defective cores do not have access to their internal buffers but still can perform routing using their outgoing ports. This way, the 4×4 NoC is effectively downgraded to 4×2 NoC.

This ability to downgrade the NoC when some cores are found defective comes from the routing logic in the routing control circuit. The routing control circuit distinguishes the different types of defects in the cores, and determines whether to block the ports to the defective cores completely, or keep these ports open but mark these defective cores as bypass-only in its routing algorithm. If some ports are disabled and the NoC is downgraded, the physical address to logical address translation for the NoC may be adjusted accordingly. For instance, the translation may need to take out the defective routers from the mapping, and reconstruct the address masks for the remaining routers.

FIG. 10 illustrates an exemplary system design of a hardware accelerator 1000 with a hierarchical NoC architecture, in accordance with various embodiments. The accelerator 1000 may be used by a host device to speed up neural network computation speed. In particular, the hierarchical NoCs within the accelerator 1000 include multiple layers of NoCs that are specifically optimized for the different data movement patterns at different hardware levels.

In some embodiments, the accelerator 1000 may include a plurality of processing units 1010 that are coupled with memories (e.g., DDRs), a data exchange interface for connecting a host device to the NN accelerator 1000, an outer-layer NoC 1020, a middle-layer NoC 1030, and an inner-layer NoC 1040. The plurality of processing units 1010 may include a plurality of NN cores and a CPU. Each NN core may include a plurality of processing entity (PE) clusters. The outer-layer NoC may be configured to transfer data between the host device and the memories, and include a bi-directional ring-shape data link connected to the data exchange interface and the memories. The middle-layer NoC may be configured to transfer data among the plurality of cores, and include a pair of uni-directional ring-shape data links, each uni-directional ring-shape data link comprising a subset (e.g., a half) of the plurality of cores. The inner-layer NoC may be within each core and configured to broadcast data among the plurality of PE clusters within the core for implementing matrix operations, and include a cross-bar network connecting a global buffer of the core to the plurality of PE clusters within the core.

Figure 11:
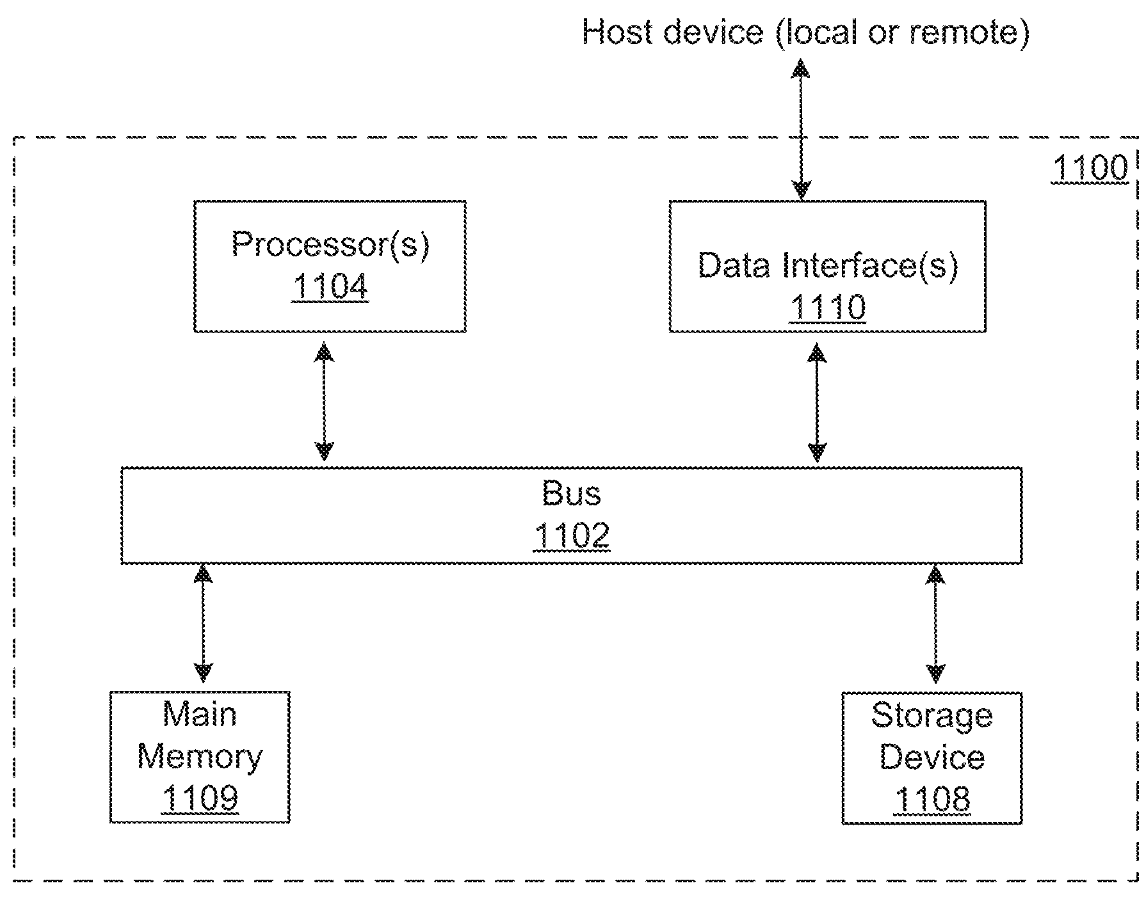
FIG. 11 illustrates an example computer system in which any of the embodiments described herein may be implemented.

FIG. 11 illustrates an exemplary computing device of a hardware accelerator with a hierarchical NoC architecture, in accordance with various embodiments. The computing device may be used to implement one or more components of the systems and the methods shown in FIGS. 1-10. The computing device 1100 may comprise a bus 1102 or other communication mechanisms for communicating information and one or more hardware processors 1104 coupled with bus 1102 for processing information. Hardware processor(s) 1104 may be, for example, one or more general-purpose microprocessors.

The computing device 1100 may also include a main memory 1109, such as random-access memory (RAM), cache and/or other dynamic storage devices, coupled to bus 1102 for storing information and instructions to be executed by processor(s) 1104. Main memory 1109 also may be used for storing temporary variables or other intermediate information during execution of instructions to be executed by processor(s) 1104. Such instructions, when stored in storage media accessible to processor(s) 1104, may render computing device 1100 into a special-purpose machine that is customized to perform the operations specified in the instructions. Main memory 1109 may include non-volatile media and/or volatile media. Non-volatile media may include, for example, optical or magnetic disks. Volatile media may include dynamic memory. Common forms of media may include, for example, a floppy disk, a flexible disk, hard disk, solid-state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The computing device 1100 may implement the techniques described herein using customized hard-wired logic, one or more ASICs or FPGAs, firmware and/or program logic which in combination with the computing device may cause or program computing device 1100 to be a special-purpose machine. According to one embodiment, the techniques herein are performed by computing device 1100 in response to processor(s) 1104 executing one or more sequences of one or more instructions contained in main memory 1109. Such instructions may be read into main memory 1109 from another storage medium, such as storage device 1108. Execution of the sequences of instructions contained in main memory 1109 may cause processor(s) 1104 to perform the process steps described herein. For example, the processes/methods disclosed herein may be implemented by computer program instructions stored in main memory 1109. When these instructions are executed by processor(s) 1104, they may perform the steps as shown in corresponding figures and described above. In alternative embodiments, hard-wired circuit may be used in place of or in combination with software instructions.

The computing device 1100 also includes a communication interface 1110 coupled to bus 1102. Communication interface 1110 may provide a two-way data communication coupling to one or more network links that are connected to one or more networks. As another example, communication interface 1110 may be a PCIe card to provide a data communication connection to a local host device, or a local area network (LAN) card to provide a data communication connection to a remote host device.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuit.

When the functions disclosed herein are implemented in the form of software functional units and sold or used as independent products, they can be stored in a processor executable non-volatile computer-readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training samples to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

The invention claimed is:

1. A many-core neural network (NN) accelerator, comprising:
- a plurality of routers, each router comprising a routing control circuit, and
- a plurality of cores respectively coupled to the plurality of routers to form a Network-on-Chip (NoC);
- wherein:
- for a given core of the plurality of cores, the routing control circuit of the router coupled to the given core is configured to:
- detect defective cores within the NoC;
- classify the defective cores as defective-with-bypass or defective-without-bypass; and
- dynamically reconfigure the NoC by adjusting routing paths to disable a NoC routing port of the router coupled to a core classified as defective-without-bypass and to keep the defective cores classified as defective-with-bypass as passive conduits for data routing.

2. The NN accelerator of claim 1, wherein to classify the defective cores, the routing control circuit is configured to:
- classify a core as defective-with-bypass in response to an internal buffer of the core being inaccessible.

3. The NN accelerator of claim 1, wherein the NoC comprises:
- an outer-layer NoC configured for data transfer between a host device and the cores;
- a middle-layer NoC configured for data transfer among the cores; and
- an inner-layer NoC within each core configured for data transfer among processing elements within the core.

4. The NN accelerator of claim 1, wherein to dynamically reconfigure the NoC, the routing control circuit is configured to adjust physical to logical address mappings.

5. The NN accelerator of claim 1, wherein to detect the defective cores, the routing control circuit is configured to monitor routing timeouts or missed heartbeats.

6. The NN accelerator of claim 1, wherein to dynamically reconfigure the NoC, the routing control circuit is configured to downgrade the NoC to a smaller configuration with a smaller number of cores and routers.

7. The NN accelerator of claim 1, wherein the plurality of cores are arranged, in a logic view, as a matrix, each row of the matrix comprising a same number of cores, and the router coupled to the given core comprises three ports, including a first port connected the given core to a horizontal ring formed by a row of cores, a second port connected the given core to a vertical ring formed by a column of cores, and a third port connected to an internal buffer of the given core.

8. The NN accelerator of claim 7, wherein to classify the defective cores, the routing control circuit is configured to:

classify the given core as defective-with-bypass in response to the third port being defective but the first port or the second port not being defective.

9. The NN accelerator of claim 7, wherein to classify the defective cores, the routing control circuit is configured to:

classify the given core as defective-without-bypass in response to the first port or the second port being defective but the third port not being defective.

10. The NN accelerator of claim 1, wherein the routing control circuit of the router is further configured to manage routing logics for data read from an internal buffer of the coupled core and data received from another router.

11. The NN accelerator of claim 10, wherein to manage routing logics for data read from an internal buffer of the corresponding core and data received from another router, the routing control circuit of a router in the plurality of routers is configured to:

convert a physical address of the router to a first logical address;

in response to the router receiving a data package for routing to a target router, convert a physical address of the target router into a second logical address;

determine a routing port of the router based on the first and second logical addresses; and route the data package through the routing port of the router.

12. A method, comprising:

detecting defective cores within a Network-on-Chip (NoC) formed by a plurality of cores, wherein the plurality of cores are respectively coupled to a plurality of routers, each router comprising a routing control circuit;

classifying the defective cores as defective-with-bypass or defective-without-bypass; and dynamically reconfiguring the NoC by adjusting routing paths to disable a NoC routing port of the router coupled to a core classified as defective-without-bypass and to keep the defective cores classified as defective-with-bypass as passive conduits for data routing.

13. The method of claim 12, wherein the plurality of cores are arranged, in a logic view, as a matrix, each row of the matrix comprising a same number of cores, and the router coupled to a given core comprises three ports, including a first port connected the given core to a horizontal ring formed by a row of cores, a second port connected the given core to a vertical ring formed by a column of cores, and a third port connected to an internal buffer of the given core.

14. The method of claim 13, wherein the classifying the defective cores as defective-with-bypass or defective-without-bypass comprises:

classifying the given core as defective-with-bypass in response to the third port being defective but the first port or the second port not being defective.

15. The method of claim 13, wherein the classifying the defective cores as defective-with-bypass or defective-without-bypass comprises:

classifying the given core as defective-without-bypass in response to the first port or the second port being defective but the third port not being defective.

16. The method of claim 12, wherein the dynamically reconfiguring the NoC comprises:

downgrading the NoC to a smaller configuration with a smaller number of cores and routers.

17. The method of claim 12, wherein the detecting defective cores comprises:

monitoring routing timeouts or missed heartbeats of the plurality of routers.

18. The method of claim 12, wherein the NoC comprises:

an outer-layer NoC configured for data transfer between a host device and the cores;

a middle-layer NoC configured for data transfer among the cores; and an inner-layer NoC within each core configured for data transfer among processing elements within the core.

* * * * *